(12) United States Patent
Chaki et al.

(10) Patent No.: US 12,122,679 B2
(45) Date of Patent: Oct. 22, 2024

(54) APPLICATIONS OF ENGINEERED GRAPHENE

(71) Applicant: Alpha Assembly Solutions Inc., Waterbury, CT (US)

(72) Inventors: Nirmalya Kumar Chaki, Bangalore (IN); Supriya Devarajan, Bangalore (IN); Barun Das, Bangalore (IN); Chetan Pravinchandra Shah, Bangalore (IN); Venodh Manoharan, Bangalore (IN); Rahul Raut, Sayreville, NJ (US); Bawa Singh, Marlton, NJ (US); Ranjit Pandher, Plainsboro, NJ (US)

(73) Assignee: Alpha Assembly Solutions Inc., Waterbury, CT (US)

(*) Notice: Subject to any disclaimer, the term of this patent is extended or adjusted under 35 U.S.C. 154(b) by 1011 days.

(21) Appl. No.: 17/046,191

(22) PCT Filed: Apr. 8, 2019

(86) PCT No.: PCT/US2019/026304
§ 371 (c)(1),
(2) Date: Oct. 8, 2020

(87) PCT Pub. No.: WO2019/199659
PCT Pub. Date: Oct. 17, 2019

(65) Prior Publication Data
US 2021/0061664 A1    Mar. 4, 2021

Related U.S. Application Data

(60) Provisional application No. 62/655,409, filed on Apr. 10, 2018.

(51) Int. Cl.
*C01B 32/194*    (2017.01)
*B29C 51/14*    (2006.01)
(Continued)

(52) U.S. Cl.
CPC ............ *C01B 32/194* (2017.08); *B29C 51/14* (2013.01); *C08K 3/042* (2017.05); *C09K 5/14* (2013.01);
(Continued)

(58) Field of Classification Search
CPC .............. C01B 32/194; C01B 2204/04; C01B 2204/22; C01B 2204/24; C01B 2204/32;
(Continued)

(56) References Cited

U.S. PATENT DOCUMENTS 4,035,265 A * 7/1977 Saunders ................. H01B 1/18
252/511
5,429,891 A    7/1995 Gozdz et al.
(Continued)

FOREIGN PATENT DOCUMENTS

CN    106374111 A    2/2017
CN    106629675 A    5/2017
(Continued)

OTHER PUBLICATIONS

Wikipedia, "Young's modulus", Jan. 26, 2018 (Jan. 26, 2018), retrieved on Jul. 15, 2019 from https://en.wikipedia.org/w/index.php?title=Young%27s_modulus&oldid=822490429; entire document, especially p. 1 para 1.
(Continued)

*Primary Examiner* — Emmanuel S Luk
*Assistant Examiner* — Elisa H Vera
(74) *Attorney, Agent, or Firm* — Stinson LLP

(57) ABSTRACT

Methods for producing graphene-based products using graphene paste compositions. These methods include producing free-standing graphene foils, films, sheets, polymer supported graphene films, printed graphene structures, graphene features on polymer films, graphene substrates, and graphene metal foils. The methods impart functional charac-
(Continued)

teristics, including corrosion protection and barrier properties to achieve selective enhancement of desired electrical, thermal, mechanical, barrier and other properties.

13 Claims, 10 Drawing Sheets

(51) Int. Cl.
*B29K 67/00* (2006.01)
*B29K 69/00* (2006.01)
*C08K 3/04* (2006.01)
*C09K 5/14* (2006.01)
*H01B 1/04* (2006.01)

(52) U.S. Cl.
CPC .......... *H01B 1/04* (2013.01); *B29K 2067/003* (2013.01); *B29K 2069/00* (2013.01); *C01B 2204/04* (2013.01); *C01B 2204/22* (2013.01); *C01B 2204/24* (2013.01); *C01B 2204/32* (2013.01); *C08K 2201/001* (2013.01); *C08K 2201/011* (2013.01)

(58) Field of Classification Search
CPC .. C01B 32/184; C09K 5/14; C08K 2201/001; C08K 2201/011; C08K 3/042; C25B 1/00; C08L 101/00; B29K 2067/003; B29K 2069/00; H01B 1/04; B29C 51/14
See application file for complete search history.

(56) References Cited

U.S. PATENT DOCUMENTS

| | | | |
|---|---|---|---|
| 8,652,687 B2 | 2/2014 | Zhamu et al. | |
| 9,434,834 B1* | 9/2016 | Redmond | C09D 11/106 |
| 2009/0005499 A1* | 1/2009 | Fisher | C09D 183/04 |
| | | | 524/588 |
| 2012/0142832 A1 | 6/2012 | Varma et al. | |
| 2012/0277360 A1* | 11/2012 | Scheffer | C08K 3/04 |
| | | | 524/237 |
| 2014/0124176 A1 | 5/2014 | Zhamu et al. | |
| 2016/0118646 A1 | 4/2016 | Ikenuma | |
| 2017/0292054 A1 | 10/2017 | Lai et al. | |
| 2018/0072573 A1 | 3/2018 | Chaki et al. | |

FOREIGN PATENT DOCUMENTS

| | | |
|---|---|---|
| EP | 2570462 A1 | 3/2013 |
| KR | 10-2011-0016289 A | 2/2011 |
| WO | 2018/217682 A1 | 11/2018 |

OTHER PUBLICATIONS

Nanowerk, "Graphene appears to be the most effective material for EMI shielding". Oct. 25, 2012 (Oct. 25, 2012), retrieved on Jul. 15, 2019 from https://www.nanowerk.com/spotlighUspotid=27088. php; entire document, especially p. 1 para 3.
European Search Report, Application No. 19785949.9, dated Dec. 2, 2021, 11 pages.

* cited by examiner

APPLICATIONS OF ENGINEERED GRAPHENE

FIELD OF THE INVENTION

The present invention relates generally to the use of graphene paste compositions in methods of producing graphene foils, films, structures and coating layers that selectively enhance desired electrical, thermal, mechanical, barrier and other properties.

BACKGROUND OF THE INVENTION

Graphene is often considered to be the most important of all graphite forms. Examples of these include 0-D: bucky balls, 1-D: carbon nanotubes, and 3-D: graphite. Graphene exhibits significantly different physical properties, in terms of electrical and thermal conductivity and mechanical strength than that of carbon nanotubes, and is better suited for industrial scale manufacturing and various practical applications. Graphene possesses unique and fascinating properties such as anomalous quantum Hall effect at room temperature, an ambipolar electric field effect with ballistic conduction of charge, tunable band gap, and high elasticity. According to current convention, graphene can be a single layer two-dimensional material, bi-layer graphene, or more than two but less than ten layers of graphene, which is referred to as "few layer graphene." Few layer graphene is often visualized as 2D stacking of graphite layers, which behaves like graphite if the number of layers exceeds ten. Most studies on the physical properties of graphene have been performed using mono-layer pristine graphene, which is obtained either by micro-mechanical cleavage or chemical vapor deposition methods. However, producing bulk quantities of graphene using these methods is still a challenging task.

Graphene is an electrically and thermally conductive material, which has a combination of several unique properties. These properties include flexibility, toughness, high Young's Modulus, and excellent barrier properties for resistance to moisture, gases and chemicals. Several potentially high-impact applications using graphene include polymer composites, interconnect applications, transparent electrical conductors, energy harvesting and storage applications such as batteries, supercapacitors, solar cells, sensors, electrocatalysts, electron field emission electrodes, electronic devices such as transistors, artificial muscles, electroluminescence electrodes, solid-phase micro-extraction materials, water purification adsorbents, organic photovoltaic components and electromechanical actuators.

In spite of the remarkable properties of graphene, the widespread, real-world use and large-scale application of graphene-enabled products has not been feasible. One of the major hurdles in producing graphene-enabled products has been the lack of suitable, environmentally friendly, high volume manufacturing (HVM) methods of high-quality graphene customized for targeted applications.

A number of methods have been suggested for the synthesis of graphene. Methods that have emerged as being suitable for HVM of graphene include Hummers' method and electrochemical exfoliation of graphite, both of which suffer from serious limitations.

In the Hummers' or Modified Hummers' method, heavily hydrophilic functionalized graphene materials are generated, known as graphene oxide. Hummers' method relies on the addition of potassium permanganate to a solution of graphite, sodium nitrate, and sulfuric acid to achieve exfoliation of graphite. The resulting flakes are either highly defective graphene or graphene oxide, where oxygen containing functionalities are present in large excess (oxygen content ≥40% by weight). These oxygen functionalities need to be removed or reduced using post treatments to produce high purity graphene. Graphene oxide is an electrically insulating material unlike electrically conducting graphene, which is not suitable for most applications. Typically, thermal or chemical reduction is necessary to produce electrically conducting graphene by partially restoring the $\pi$-electrons from graphene oxide. Another major limitation and often a downfall of Hummers' method is the large quantity of acidic waste generated during the process. Graphene oxide has been used as the key precursor material to produce graphene based products, such as graphene paste, inks, foils and supported films. Lack of a suitable HVM process of high quality graphene materials restricts the widespread use of these types of graphene products.

Efforts to develop environmentally innocuous, scalable synthetic methods for bulk-production of high-quality graphene have included solvent and/or surfactant-assisted liquid-phase electrochemical exfoliation expansion and formation of graphite intercalated compounds. Electrochemical exfoliation methods of graphite sheets and blocks have shown significant advances in rapidly producing high quality graphene in an environmentally benign manner.

There are two kinds of electrochemical exfoliation processes: anodic and cathodic. The electrochemical exfoliation process, in both cases, can be divided into two steps: intercalation of suitable ions between the graphite interlayers through electrostatic interactions and then generation of various gases, leading to the production of few-layered graphene flakes from the swollen/expanded bulk graphite under electrochemical biasing conditions. The anodic process is the most efficient in terms of yield of the final product, but it creates a substantial amount of defects/ functionalization in the resulting graphene material. On the other hand, the cathodic process results in much higher quality graphene material, but yield needs to be significantly improved for high volume manufacturing.

U.S. Pub. No. 2018/0072573 to Chaki et al., the subject matter of which is herein incorporated by reference in its entirety, describes a simple, environmentally benign, scalable electrochemical graphite exfoliation process to produce different grades of high-quality graphene. One of the key features of this process is the flexibility to produce graphene flakes having different types of flake characteristics ("engineered graphene flakes") that have been selected and optimized.

The physical properties of engineered graphene are governed by the flake's lateral dimensions, thickness, surface area, defects present, oxygen content and crystallinity. The electrochemical exfoliation process of U.S. Pub. No. 2018/0072573 uses multiple exfoliating ions of various sizes at various ratios, along with electrochemical process parameters, such as duty cycle and changing the polarity, to produce different grades of graphene flakes. Furthermore, electrochemically produced graphene flakes can be post treated, either chemically or thermally, to further enhance their electrical and thermal properties. Graphene flakes produced from the electrochemical exfoliation process possess unique combinations of properties such as surface and edge functionalization, high aspect ratio and excellent electrical and thermal conductivities that make them suitable for developing graphene based industrially relevant products. Critically, the oxygen content of these electrochemically produced graphene flakes can be tailored from 0.1 to 40% by weight. Thus, engineered graphene can offer environmentally benign, scalable, cost effective and high-quality alternatives to graphene oxide for the development of graphene-based products but applications and optimization for employing engineered graphene in various graphene-based products have yet to be efficiently manufactured in the marketplace.

SUMMARY OF THE INVENTION

It is an object of the present invention to provide an improved method for producing graphene-based products using graphene paste compositions.

It is another object of the present invention to provide methods of producing free-standing graphene foils, films, sheets, polymer supported graphene films, printed graphene structures, graphene features on polymer films, graphene substrates such as circuit boards, and graphene metal foils.

It is still another object of the present invention to provide methods for producing graphene containing coatings, films and foils that impart functional characteristics, such as corrosion protection and barrier properties such as resistance to moisture, gases, and chemicals to a substrate.

It is another object of the present invention to produce graphene-containing coatings that are capable of imparting electrical and thermal properties, including conductivity to a substrate.

It is yet another object of the present invention to provide graphene structures that are highly flexible, mechanically strong, have high-temperature stability, have barrier and corrosion protection properties, and possess excellent thermal and electrical conductivities or properties such as electromagnetic interference (EMI) shielding properties, or any combination of these characteristics.

It is yet a further object of the present invention to provide methods of using graphene for applications involving EMI shielding, high-energy beam stripper foils, thermal heat spreaders, electrodes supercapacitors, sensor assemblies, and other similar applications.

One embodiment of the present invention relates generally to a graphene paste composition comprising:
  from 5 to 15 wt % of engineered graphene flakes; and
  from 60 to 95 wt % solvent(s); and
  from 0 to 10 wt % polymeric resin binder(s); and/or
  from 0 to 1 wt % surfactant and additive mixtures; and/or
  from 0 to 1.5 wt % of thermal or photo-curing curing catalyst(s).

In another embodiment, the present invention relates generally to a method of making graphene foils, the method comprising the steps of:
  a) providing a graphene paste composition comprising:
    i. graphene flakes, wherein the graphene flakes comprise engineered graphene;
    ii. one or more solvents;
    iii. one or more functional additives; and
    iv. one or more binders; and
  b) applying the graphene paste to a substrate to form a graphene foil on the substrate; and
  c) curing the applied paste; and
  d) optionally, releasing the graphene foil from the substrate to obtain a free-standing foil.

In yet another embodiment, the present invention generally relates to a method of making thermoformed structures, the method comprising the steps of:
  a) providing a graphene paste composition comprising:
    i) engineered graphene flakes; and
    ii) one or more solvents; and/or
    iii) one or more polymeric resin binders; and/or
    iv) one or more surfactants, additive mixtures, and combinations thereof; and/or
    v) one or more thermal curing catalyst; and
  b) applying the graphene paste to a polymeric substrate to form a graphene coated polymer structure; and
  c) curing the applied paste; and
  d) optionally, thermal heating and/or mechanically compacting the graphene coated polymer structure; and
  e) thermoforming the graphene coated polymer structure.

In still another embodiment, the present invention relates generally to a graphene paste composition comprising:
  from 0.1 to 4.3 wt % of engineered graphene flakes;
  from 0.8 to 5 wt % of graphene, graphene oxide, reduced graphene oxide, and combinations thereof;
  from 60 to 95 wt % solvent(s);
  from 0 to 10 wt % polymeric resin binder(s);
  from 0 to 1 wt % surfactant and additive mixtures; and/or
  from 0 to 1.5 wt % of thermal or photo-curing curing catalyst(s).

Figure 1:
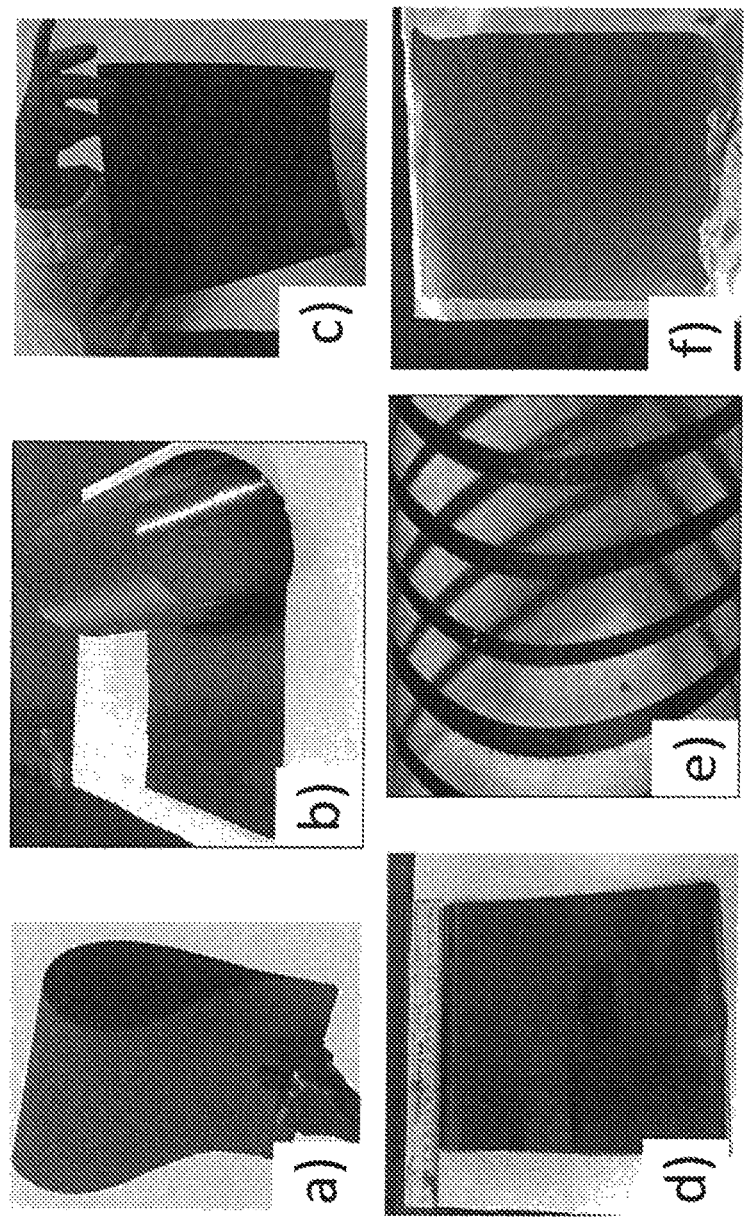
FIG. 1: (a) to (f) depict images of free-standing graphene foils prepared using graphene paste Example 5 with varied dimensions. The dimensions are: (a) 2.5 cm×6.5 cm; (b) 10 cm×25 cm; (c) 12.7 cm×20 cm; (d) 20 cm×23 cm, which were prepared by stencil printing and printing using a semi-automatic film coater. Images (e) and (f) show dried graphene paste printed in the form of lines and film on flexible PET and aluminum foil substrates respectively.
Figure 2:
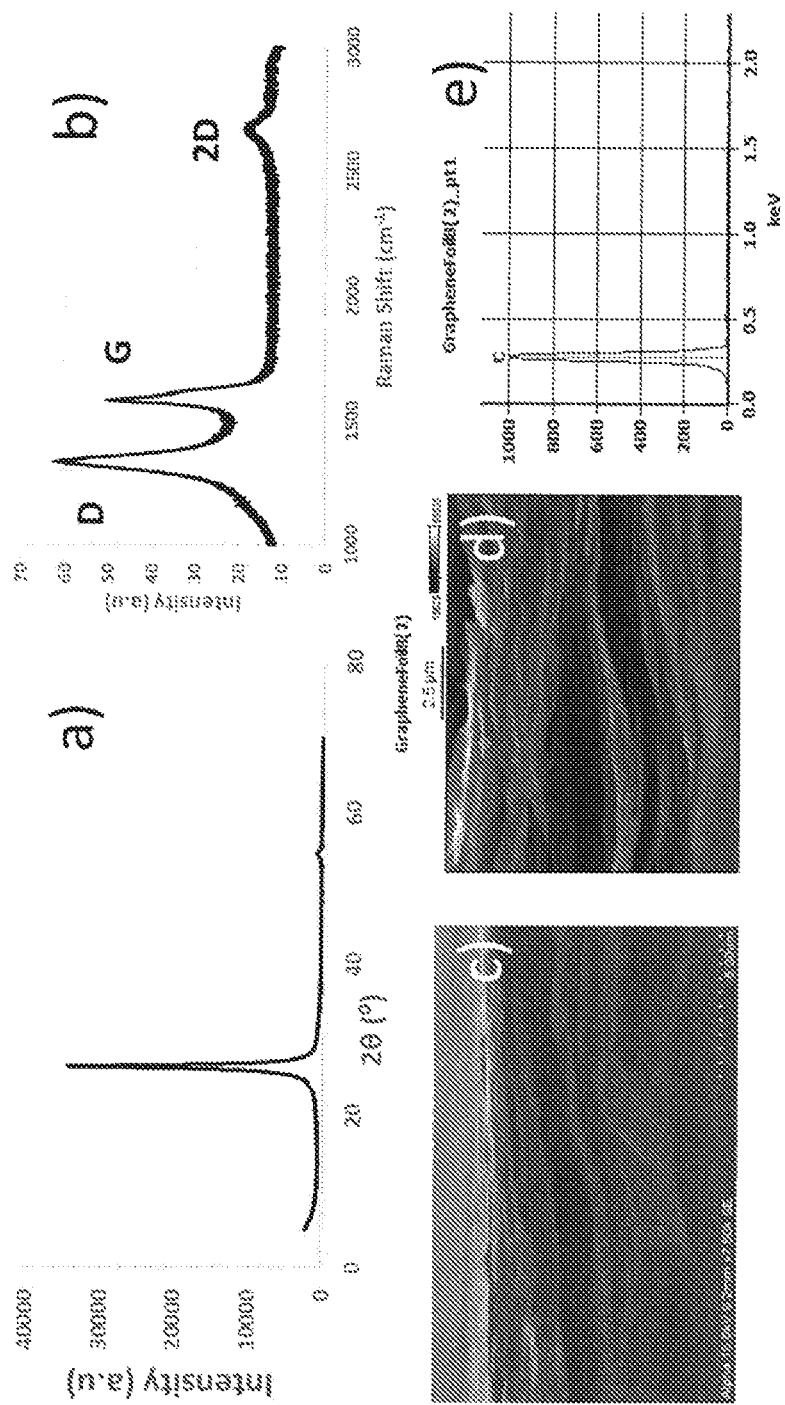
FIG. 2: depicts a typical (a) PXRD pattern, (b) Raman spectrum, (c) FESEM cross-sectional analysis images with low-magnification, (d) FESEM cross-sectional analysis images with high-magnification and (e) EDS of graphene foil F8.

Typical PXRD pattern of the foil is depicted in FIG. 2(a) which shows the sharp (002) peak centered around 2θ~26°. These results confirm the long-range ordering of graphene layers in this foil. The typical representative Raman spectrum of the foil is shown in FIG. 2(b) which includes D-, G-band and less intense 2D-bands.

Images (c) and (d) show the layered arrangement of graphene layers inside the foils. FIG. 2(e) indicates a significant amount of carbon in the foil.

Figure 3:
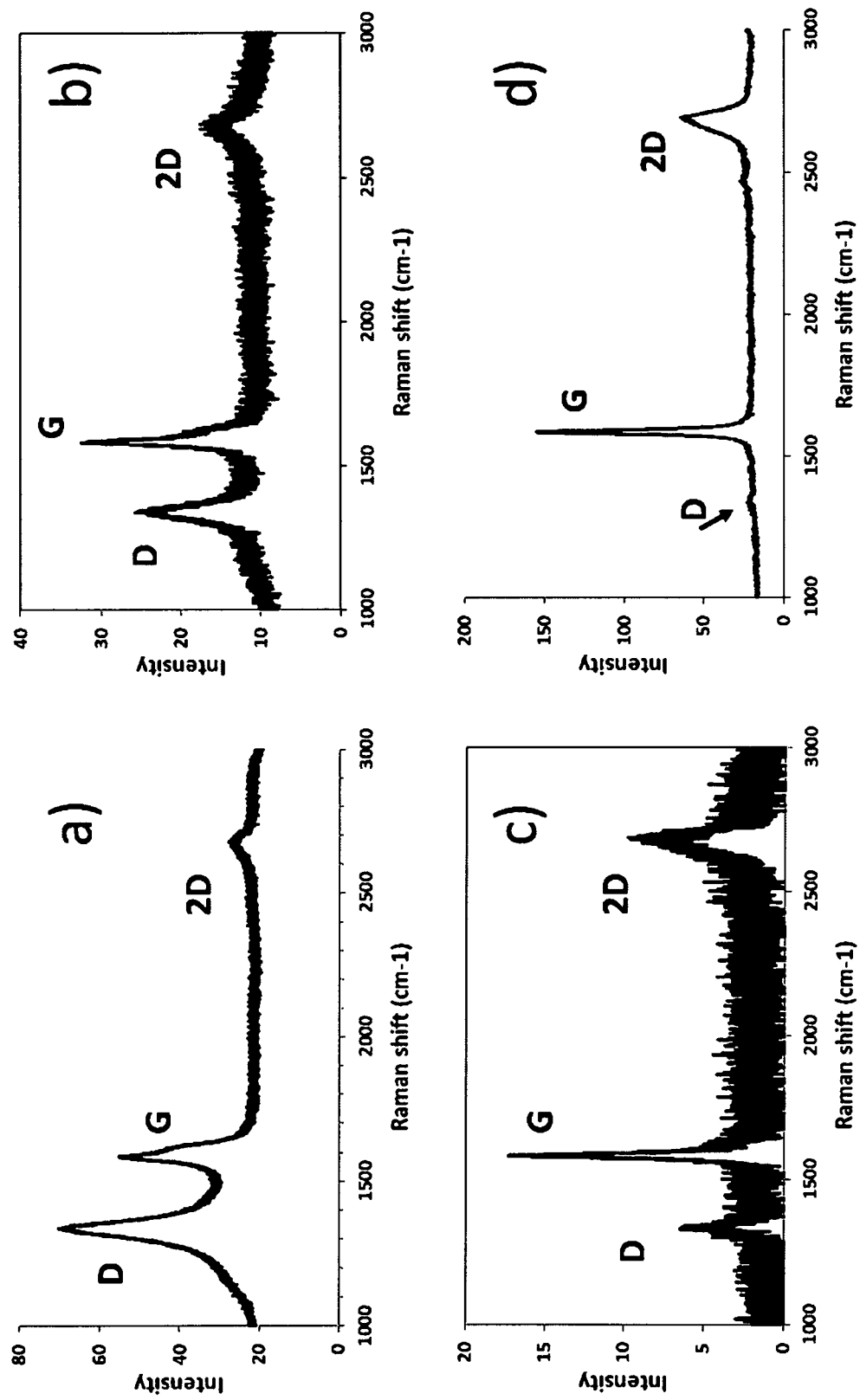

FIG. 3: depicts typical Raman spectra of graphene foils annealed at (a) 1000° C. (Graphene foil F10), (b) 1500° C. (Graphene foil F11), (c) 1900° C. (Graphene foil F27) and (d) 2750° C. (Graphene foil F28) respectively.

The D, G and 2D bands of corresponding graphene foils are marked in the respective figures. It can be seen that with an increase in the annealing temperature, there is a gradual reduction in the ratio of the intensities of $I_D/I_G$ bands and a corresponding increase in the intensity of the 2D-band. This result confirms that chemical and structural defects disappear and the sp$^2$ backbone of graphene is restored upon graphitization (~2700° C.).

Figure 4:
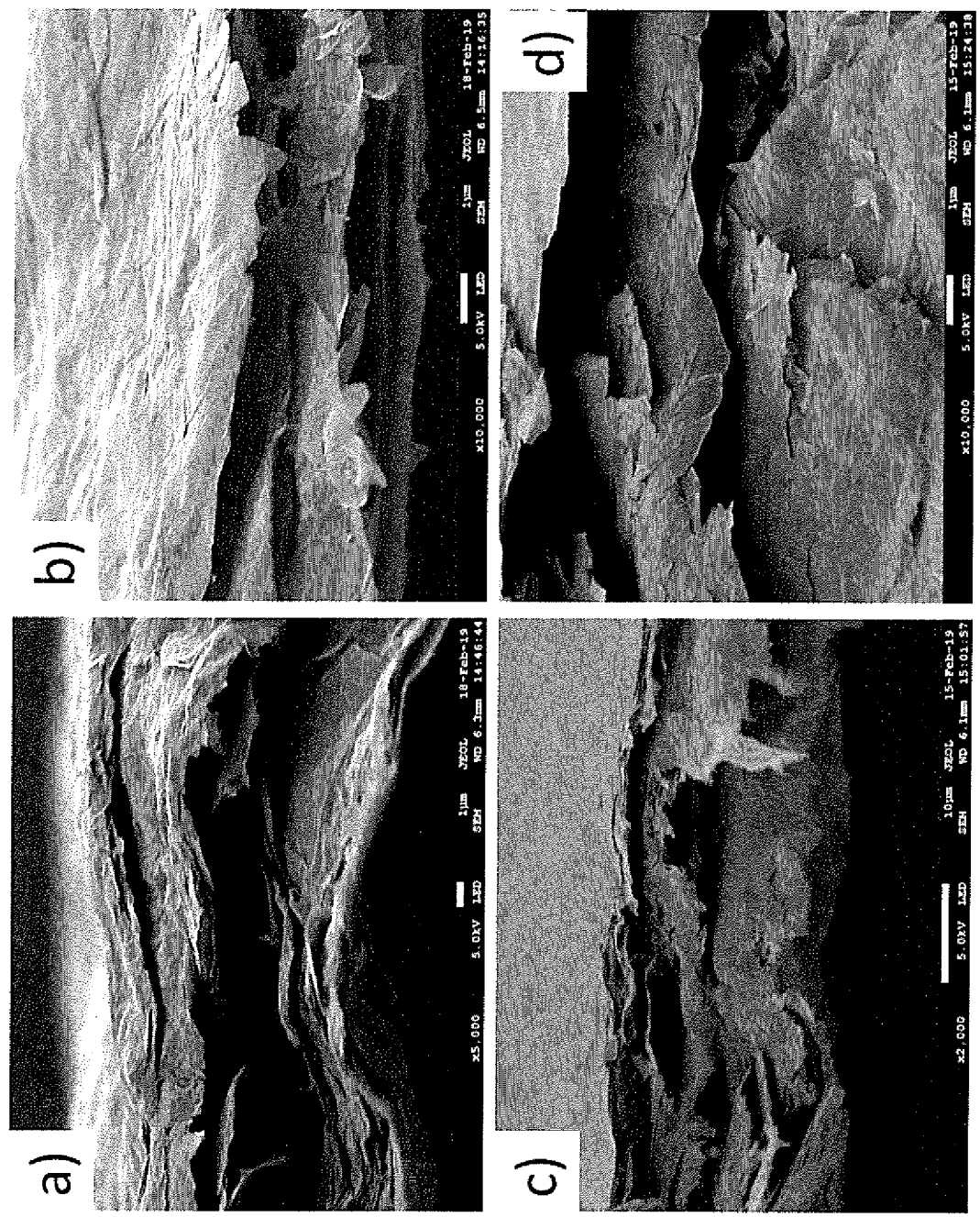

FIG. 4: depicts FESEM cross-sectional analysis of microstructures of F27 (a-b) and F28 (c-d) foils respectively.

These images indicate the presence of long-range ordering/interaction of individual graphene layers in the graphene foils due to graphitization by heating at 2750° C.

Figure 5:
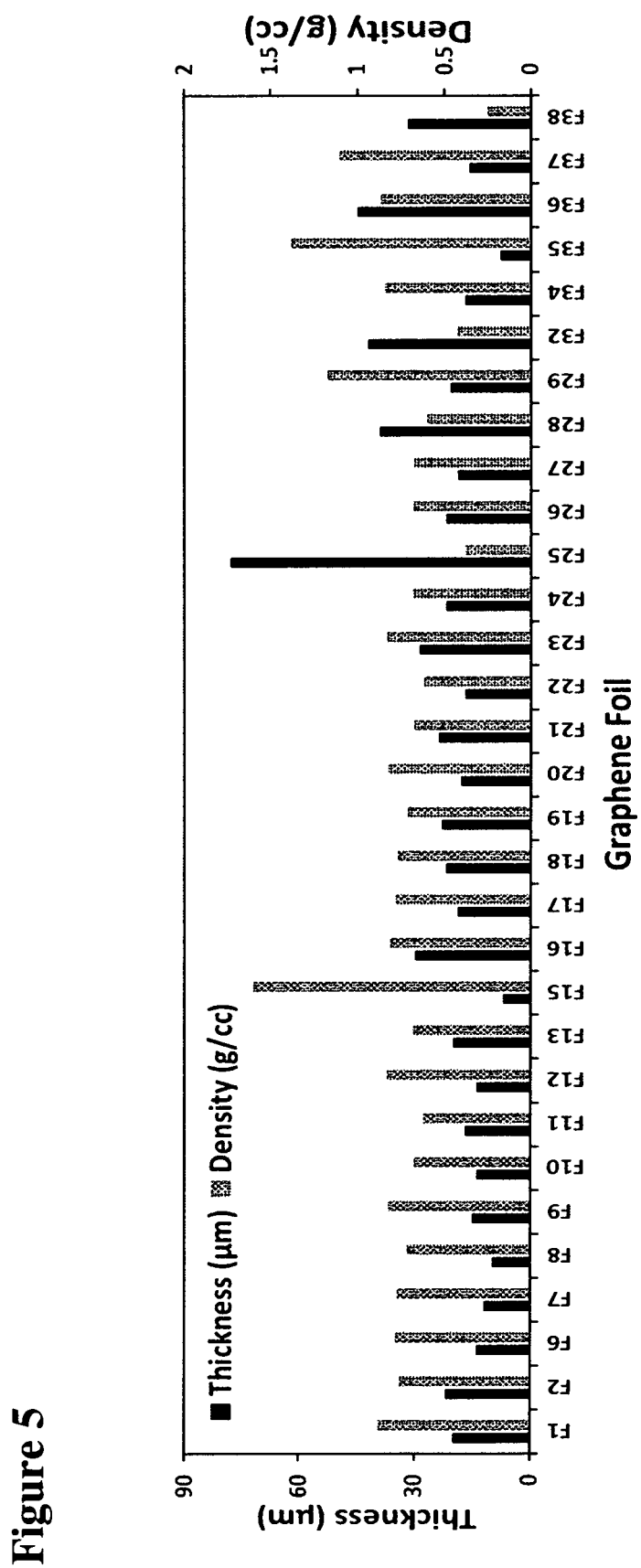

FIG. 5: Typical thickness and density values obtained for graphene foils that were subjected to different processing conditions are shown, as described in Table 2. The measurements indicate that high annealing temperatures along with mechanical compression causes reduced thickness, while increasing the density of these graphene foils.

Figure 6:
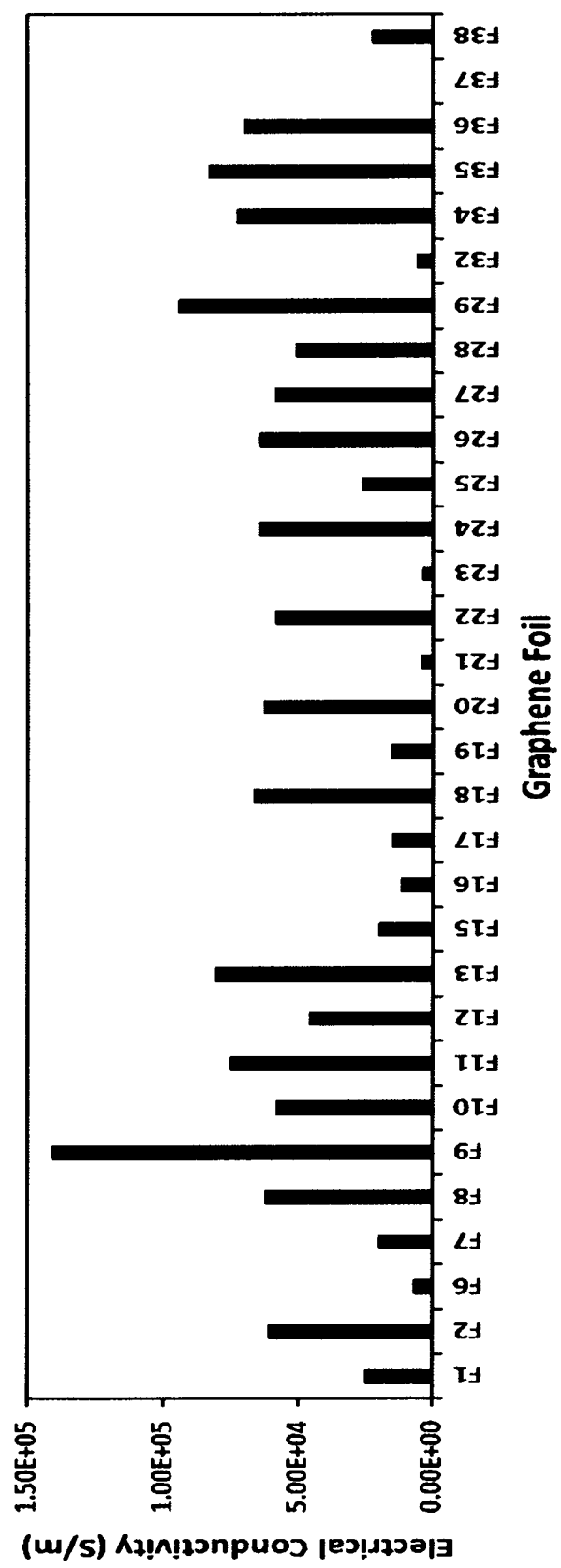

FIG. 6: depicts a histogram showing the typical electrical conductivity values obtained for graphene foils subjected to different processing conditions as listed in Table 2.

Figure 7:
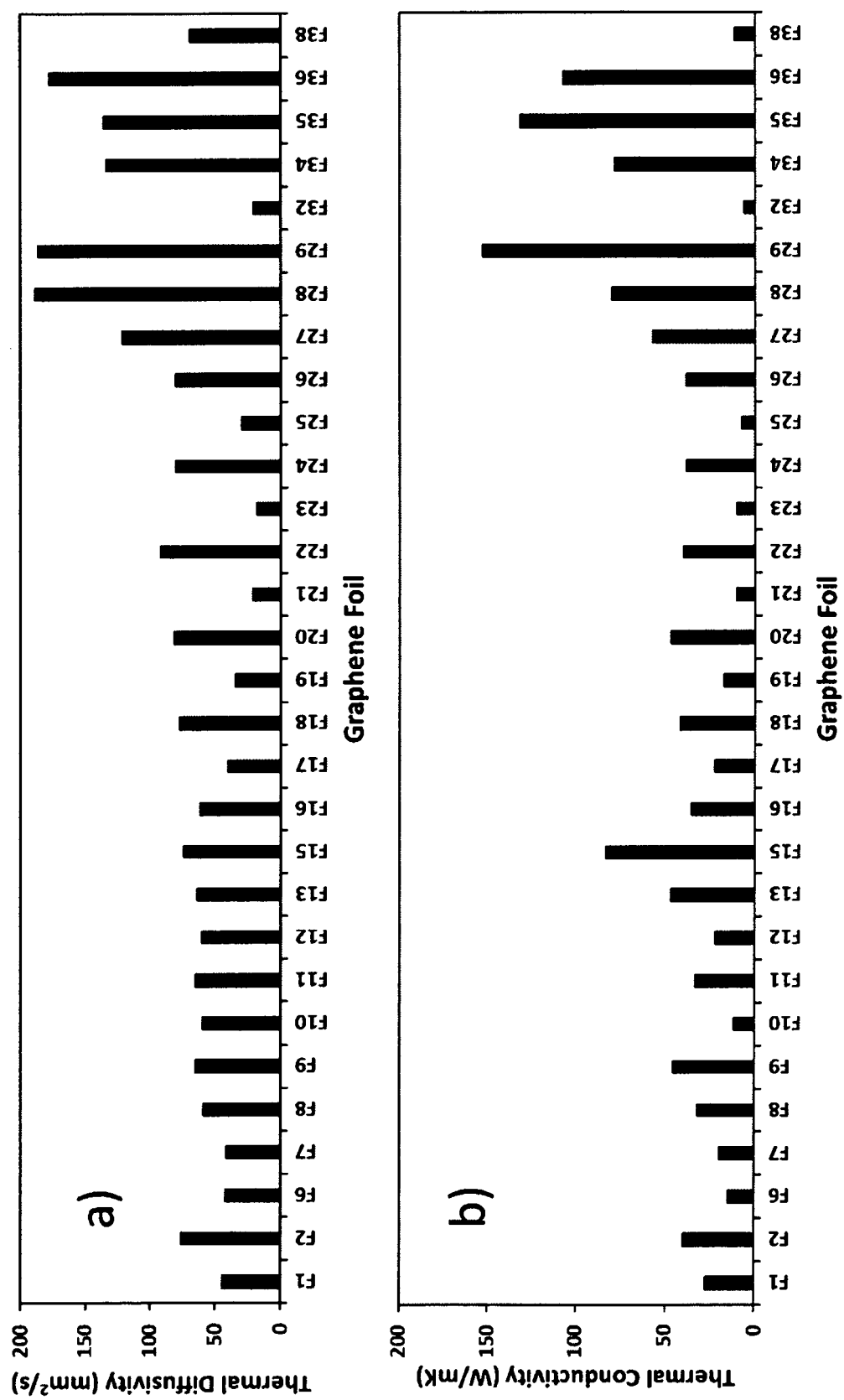

FIG. 7: depicts a histogram showing the typical thermal diffusivity and conductivity values obtained for graphene foils subjected to different processing conditions as listed in Table 2.

Figure 8:
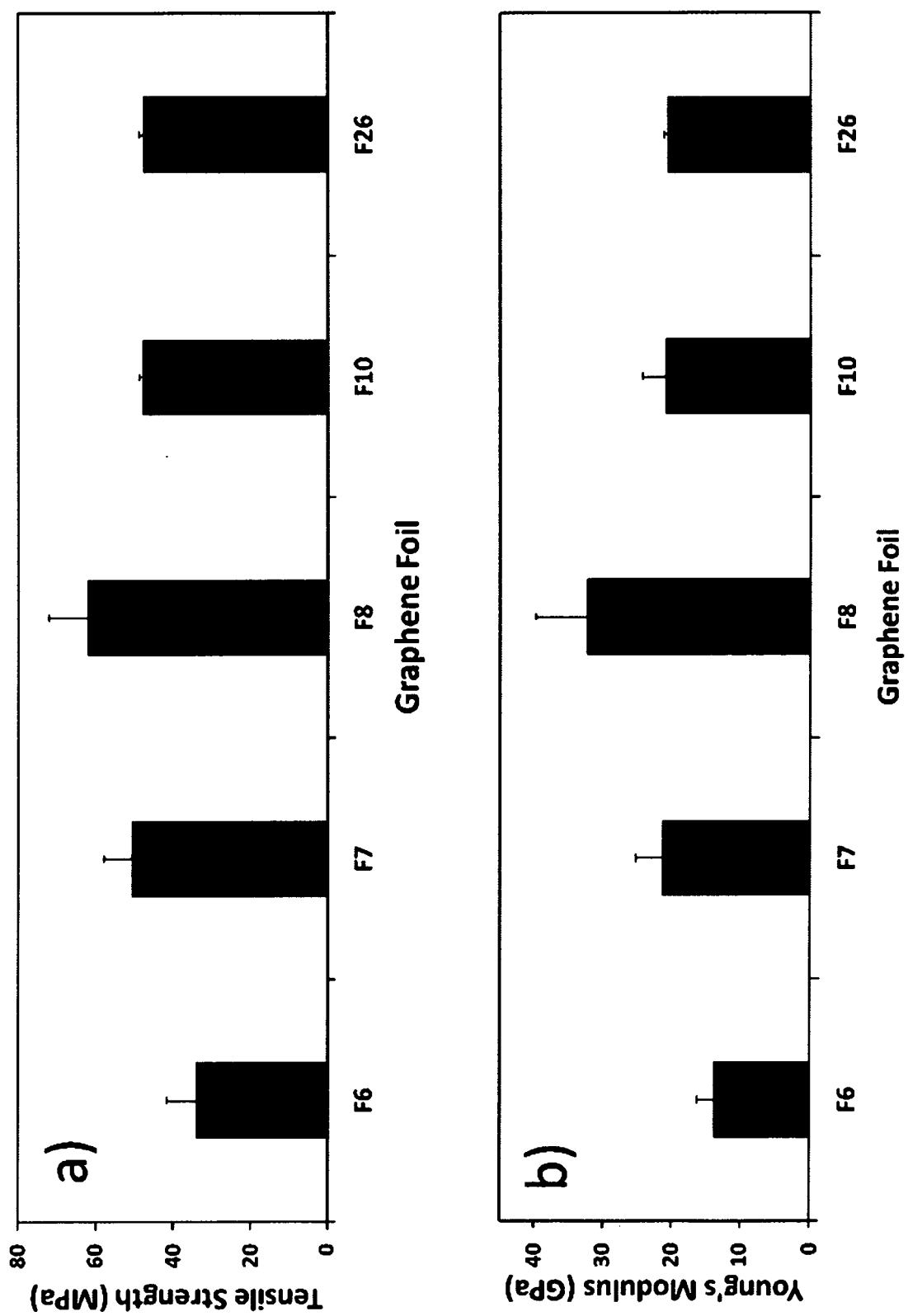

FIG. 8: depicts a histogram showing typical Tensile Strength and Young Modulus values of graphene foils subjected to different processing conditions as listed in Table 3.

Figure 9:
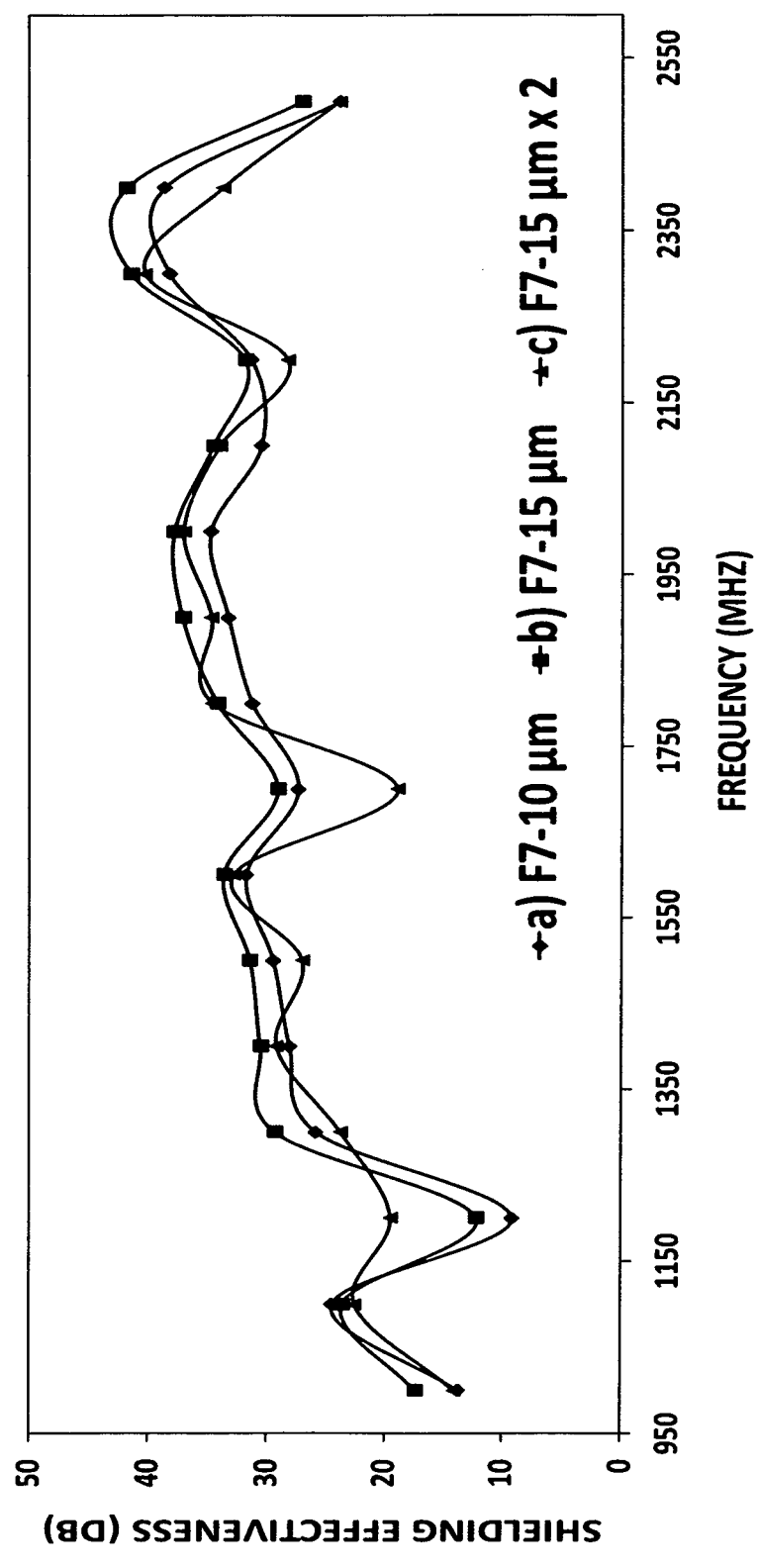

FIG. 9: depicts EMI shielding effectiveness of F7 graphene foils as described in Table 2 for different thicknesses: (a) 10 µm; (b) 15 µm and (c) two 15 µm foils placed on top of each other.

Figure 10:
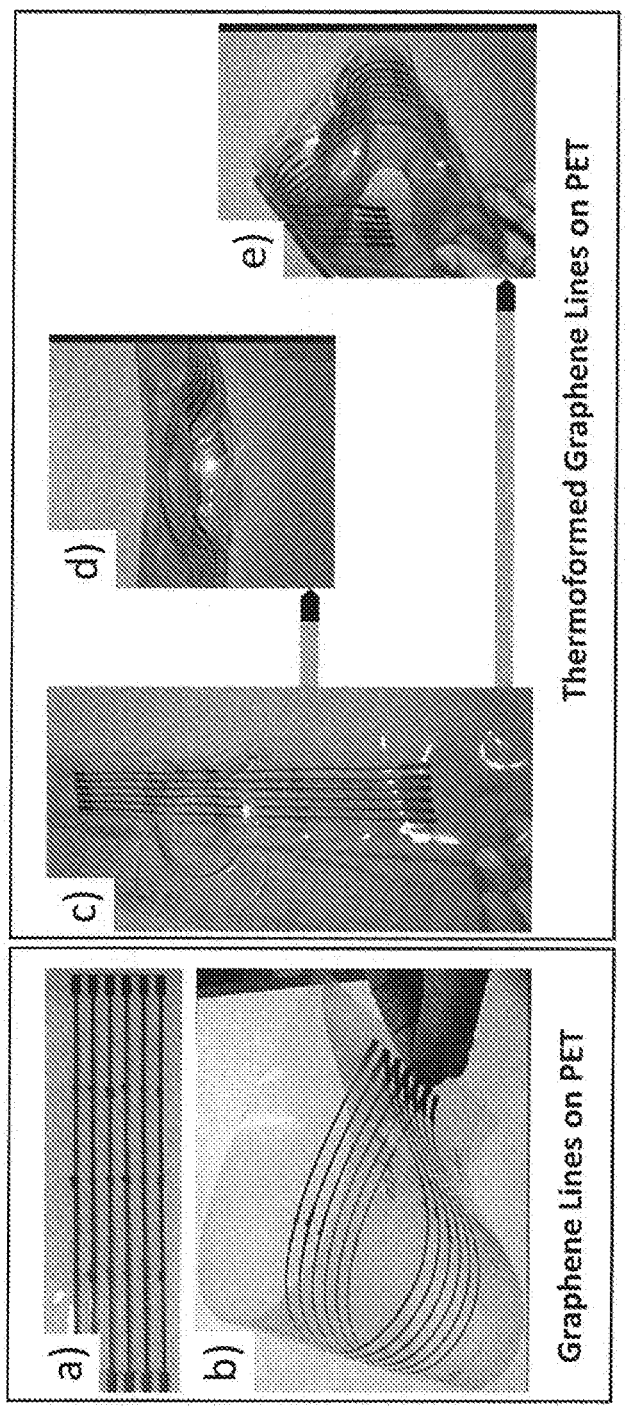

FIG. 10: depicts dried graphene lines printed on PET (a-b) and thermoformed graphene lines printed on PET (c-e).

DETAILED DESCRIPTION OF THE PREFERRED EMBODIMENTS

Graphene pastes can be useful in producing a variety of applications such as graphene foils, films, coatings and structures for EMI shielding, high-energy beam stripper foils, thermal heat spreaders, electrode materials for batteries and supercapacitors, gas and moisture barrier layers, corrosion protection coatings and films and high thermal conducting substrates for electronics or sensors assembly.

Graphene is a material with a unique combination of properties with a potentially very large number of applications. Many of these applications will require graphene to be tailored with a specific combination of properties. High quality graphene flakes that do not negatively impact the electrical and thermal characteristics when used in graphene paste formulations are critical for use in these applications.

The present invention relates to applications using graphene for producing graphene-based pastes, foils, films, coatings and structures. These applications are used, for example, in EMI shielding, high-energy beam stripper foils, thermal heat spreaders, electrode and other structures for battery and supercapacitors, gas and moisture barrier membranes or coatings, corrosion protection and coatings, high thermal conducting substrates for electronics, and sensor assembly, among others. Methods of making such pastes, foils, films, coatings and structures are described herein.

Graphene enabled products typically require more than one type of graphene and different categories of graphene may be necessary for different applications. Thus, different grades or types of graphene, with specific properties or combination of properties, may be best suited for different end applications or products. Additionally, the specific category of graphene flakes used for a particular application may need to be tailored for that specific application. Many end-use applications and products may be best served by using a mixture of different graphene. Many end-use applications and products may require the addition or incorporation of other graphitic or carbon forms, such as carbon black, graphite platelets and carbon nanotubes along with graphene.

Graphene has novel and unique properties when combined with other nano and micron materials, such as metals, alloys, semiconductors and insulators. These combinations can be utilized to induce or enhance desired end-properties. Examples of desirable properties include thermal and electrical conductivity, barrier properties, joining or sintering of flakes, and electromagnetic shielding properties of graphene enabled products.

Examples of graphene enabled products and end-use applications using engineered graphene include free-standing foils, graphene films and coatings on substrates and components. These products are useful in EMI applications, for thermal management, minimizing beam scattering in beam stripping applications and as barrier membranes. Engineered graphene can also be used in applications with formable and stretchable substrates, sensors, molded interconnect devices, and white goods. Graphene films and coatings can be used on polymer, metal, and ceramic substrates.

Graphene paste can be used in methods of producing free-standing graphene foils, graphene films, graphene sheets, polymer supported graphene films, printed graphene structures and features on polymer films, circuit boards, and metal foils. Graphene containing coatings impart functional characteristics, such as corrosion protection, and various barrier properties such as resistance to moisture, gases, and chemicals. Furthermore, graphene containing coatings can impart electrical and thermal conductivity as well as chemical resistance.

In one embodiment, the present invention generally relates to a method of making end use products comprising engineered graphene alone or in combination with other types of graphene or with carbon materials, such as graphite, carbon black, or carbon nanotubes to impart additional features and characteristics for a specific application. Non-carbon, nano and/or micron sized materials, such as metals and ceramics, can also be added to impart additional features and characteristics.

Engineered graphene can be used in a paste composition wherein the paste composition may comprise of one or more polymeric binders, solvents, surfactants, thermoplastic resins or thermoset resins in combination with other functional additives, crosslinking agents, and curing agents. A paste made from engineered graphene may contain a single solvent or solvent mixtures including water. The paste composition may include one or more surfactants, one or more thermoplastic resins as binders, one or more crosslinkable thermoset network forming resins as binders, crosslinking hardeners, curing catalysts, and other functional additives. The addition of nano- and/or micron-sized materials to the graphene paste can enhance both electrical conductivity and EMI shielding properties.

In another embodiment, the graphene paste composition preferably comprises from 5 to 15 wt % of engineered graphene flakes, from 60 to 95 wt % solvent(s), from 0 to 10 wt % polymeric resin binder(s), from 0 to 1 wt % surfactant and additive mixtures, and from 0 to 1.5 wt % of thermal or photo-curing catalyst(s).

In another embodiment, selection of suitable types and grades of engineered graphene used in paste compositions for producing graphene foils, films, structures and coating layers in combination with other compounds allows for selectively enhancing desired electrical, thermal, mechanical, barrier and other properties.

Graphene flakes that are used in the graphene pastes can be produced in different grades, that each possess different combinations of properties. A particular grade of graphene flake can possess a characteristic set of physical properties that are dependent on its lateral dimension, flake thickness, surface area, defects present, oxygen content and crystallinity. Appropriate selection of a graphene grade is the key to controlling and refining the properties of graphene pastes as well as graphene foils, graphene coatings, and polymer supported graphene films.

In certain embodiments, examples of graphene paste formulations are disclosed, where engineered graphene grades, designated as A, B, C and D can be present alone or in combination in different proportions. Typical physical properties of the different grades of graphene flakes are summarized in Table 1. These engineered graphene grades can be prepared by electrochemical exfoliation of graphite flakes and sheets or other such materials and post processing treatments of these flakes as disclosed in U.S. Pub. No. 2018/0072573 by Chaki et al.

TABLE 1

Characteristics of Different Grades of Graphene Flakes

| Properties | Graphene Grade A | Graphene Grade B | Graphene Grade C | Graphene Grade D |
|---|---|---|---|---|
| Lateral Dimension (μm) | 1-50 | 1-50 | 0.1-10 | 0.1-50 |
| Thickness (nm) | 1-100 | 1-100 | 1-20 | 1-50 |
| Oxygen Content (wt %) | 0.1-5 | 1-20 | 1-20 | 10-40 |

Graphene pastes can be used to produce free-standing graphene foils, membrane films and sheets, polymer supported graphene films and coatings, printed graphene structures, and graphene features on polymer films. Graphene pastes can also be used to produce graphene coatings that impart functional characteristics such as corrosion protection on components or structures. The pastes can also be used to create graphene barrier coatings on components and structures. Graphene paste is a convenient and versatile form of graphene that has multiple applications as well as being an intermediate material for producing foils, films, coatings and other structures.

Several types of organic solvents can be used either alone or in mixtures in the paste compositions. These solvents include, but are not limited to N,N-dimethyl formamide, N-methyl pyrrolidone, N-ethyl 2-pyrrolidone, cyclohexanone, Cyrene™; diols such as ethylene glycol, propylene glycol, dipropylene glycol, 1,3-butane diol, 2,5-dimethyl-2,5-hexane diol; glycol ethers, such as ethylene glycol monobutyl ether, diethylene glycol mono-n-butyl ether, propylene glycol n-propyl ether, terpineol, butyl carbitol acetate, glycol ether acetates, carbitol acetate and propylene carbonate, as well as other similar compounds. Water can also be used either exclusively or as the primary solvent, in the graphene paste. If the paste comprises water, the water should be free of any charged ions and/or impurities. For example, the water may be demineralized water, deionized water, Nanopure water, Millipore water or Milli-Q water.

The graphene paste can additionally comprise one or more thermoplastic resins, including ethylene copolymers bearing esters, nitriles, acids, phenoxy, hydroxyl, and acrylates. Examples of useful ethylene copolymers include ethylene-ethyl acrylate copolymer (EEA), ethylene-methyl methacrylate copolymer (EMMA), ethylene-vinyl acetate copolymer (EVA), ethylene vinyl acetate copolymer (EL-VAX), ethylene-methacrylic acid copolymer and Elvalay® resins. Several commercially available phenoxy resin examples include polyester, polyacrylate, polyurethane, polyether, and polyamide backbones (eg. LEN-HB, PKHW-34, PKHW-35, PKHA-36, PKHA, PKHS-40, PKHM-85, PKHB-100, PKHP-80, SER-10, Araldite CY 205, Ebecryl 3708, etc.). In one embodiment, the paste comprises polyester resins, polyacrylate resins, polyurethane resins, polyimide resins (BR720 from ABR Organics), or combinations thereof, including polyol, hydroxyl, amine, carboxylic acid, amide, and aliphatic chains.

Acrylic resins such as polyacrylonitrile (PAN), polymethyl methacrylate (PMMA), polybutyl methacrylate (PBMA) are also used in the graphene paste. Other useful resins include halo-polymers such as polytetrafluoroethylene (PTFE), polyvinylidene fluoride (PVDF), polyvinyl chloride (PVC), polyvinylidene chloride (PVDC), poly(vinylidene chloride), poly(vinylidene chloride-co-acrylonitrile), poly(vinylidene chloride-co-methyl acrylate) and poly(acrylonitrile-co-vinylidene chloride-co-methyl methacrylate); aliphatic polyamides such as polycaprolactam (Nylon 6); aromatic polyamides such as aramides, poly(m-phenyleneisophtalamide), poly(p-phenyleneterephtalamide); polyesters such as polybutylene terephtalate (PBT), polycarbonates (PC), polyethylene terephthalate (PET), polyvinyl acetate (PVAc); polyethylenes such as low-density polyethylene (LDPE), high-density polyethylene (HDPE), ethylene vinyl acetate (EVA) and ethylene vinyl alcohol (EVOH); styrene derivatives such as polystyrene (PS), acrylonitrile-butadiene-styrene (ABS) terpolymer, styrene-acrylonitrile copolymer, polyoxymethylene (POM) and copolymers, polyphenylene ether (PPE), polyphenylene sulphide (PPS), polypropylene (PP), polyvinyl alcohol (PVOH), polyvinyl chloride (PVC); and thermoplastic elastomers such as thermoplastic polyurethane (TPU).

Thermoset resin can be used for the formation of three-dimensional networks in the graphene paste by reacting resin with suitable hardeners, curing agents, catalysts, and initiators. These networks can be formed by the reaction of epoxy resins with hardeners comprising amines, acids, anhydrides, reaction of acid or its derivative with amine, reaction of acid or its derivatives with alcohol, reaction of compounds comprising multiple carbon-carbon bonds having allyl, vinyl, (meth)acrylate, (meth)acrylamide functionality in presence of catalyst, reaction of hydroxyl or amine with isocyanate resin. The thermoset networks produced are termed as either polyether, polyacrylate, polyurethane, polyester, polyamide or polyurea.

Examples of useful compounds comprising multiple carbon-carbon bonds with either allyl, vinyl, (meth)acrylate, and (meth)acrylamide functionality are N,N-dimethylacrylamide, N,N-dimethylmethacrylamide, N-hydroxyethyl acrylamide, N-vinyl-pyrrolidone, N-vinylpyrrole, N-vinyl succinimide, alkyl vinyl ethers, 2-acrylamido glycolic acid, 2-hydroxyethyl methacrylate (HEMA), hydroxypropyl methacrylate, dimethylaminoethyl methacrylate, glycerol methacrylate, 2-ethyl hexyl acrylate, butyl acrylate, isooctyl acrylate, methyl methacrylate, lauryl acrylate, dodecyl acrylate, tetrahydrofurfuryl acrylate, bisphenol A-ethoxylate dimethacrylate, butyl acrylate, acrylic acid, vinyl acetate, allyl alcohol, acrylic acid, methacrylic acid, vinyl acetate, glycidyl methacrylate, trimethylolpropane triacrylate, isobornyl acrylate, poly(ethylene glycol) methacrylate, 2-(diethylamino)ethyl methacrylate, 2-(diethylamino)ethyl acrylate, N-vinyl caprolactum, N-vinylformamide, N-vinyl acetamide, N-vinyl imidazole, 2-acrylamidoglycolic acid, aminopropyl methacrylate, 3-tris(trimethylsiloxy)silylpropylmethacrylate (TRIS), and bis-(trimethylsiloxy)methylsilylpropyl methacrylate.

The graphene paste may also comprise epoxy resin including, for example, bisphenol-A epoxy, 4-vinyl-1-cyclohexene 1,2-epoxide, 3,4-epoxy cyclohexyl methyl-3',4'-epoxy cyclohexene carboxylate, 1,4-butanediol diglycidyl ether, trimethylolpropane triglycidyl ether, triglycidyl isocyanurate, epoxy siloxane, epoxy silane and phenol novolac epoxy. The reaction products of hydroxy terminated polyol, hydroxy terminated poly(ethylene oxide), hydroxy terminated poly(dimethylsiloxane), trimethylolpropane ethoxylate or amines such as butyl amine, triethylene tetramine (TETA), 2,4,6-triaminopyrimidine (TAP), N,N-diethyl amino ethanol and amino ethanol with methylbenzyl isocyanate, (trimethylsilyl) isocyanate, 1-naphthyl isocyanate, 3-(triethoxysilyl) propyl isocyanate, phenyl isocyanate, allyl isocyanate, butyl isocyanate, hexyl isocyanate, cyclohexyl isocyanate of furfuryl isocyanate, isophorone diisocyanate, hexamethylene diisocyanate, m-xylylene diisocyanate, 1,4-cyclohexylene diisocyanate, poly(propylene glycol), and tolylene 2,4-diisocyanate, can additionally be used as thermoset network forming resins and cross linkers in the graphene paste.

The graphene paste may also comprise functional additives including organic molecules, polymers, surfactants and rheology modifiers that can improve the functional features of the formulations and these additives can be used alone or in combination. Processing and ease of printing of the resulting graphene paste can be improved by adding 0.1-10% of a mixture of different functional additives. Examples of commercially available ionic and non-ionic surfactants are SPAN-80, SPAN-20, Tween-80, Triton-X-100, Sorbitan, IGEPAL-CA-630, Nonidet P-40, Cetyl alcohol, FS-3100, FS-2800, FS-2900, FS-230 and FS-30. Examples of commercially available rheology modifiers are THIXIN-R, Crayvallac-Super, Brij 35, 58, L4, O20, S100, 93, C10, O10, L23, O10, S10 and S20.

Other functional additives can be used to improve printing, rheology and film forming performance, including, different commercially available wax solutions, such as Cerafak 102, Cerafak 106, Cerafak 108, Cerafak 110 and Cerafak 111, Ceratix 8466, Ceratix 8463, Ceratix 8466, micronized polymer with wax-like properties such as Ceraflour 920, Ceraflour 929, Ceraflour 991, Ceraflour 1000, defoamers, such as BYK077 and BYK054. These additives improve the homogeneity of the graphene paste and improve several physical properties of the graphene paste, such as surface tension, surface wetting, tackiness and rheology modification.

Hardeners and curing agents that can be used in the paste composition include amines such as butyl amine, triethylene tetramine (TETA), 2,4,6-triaminopyrimidine (TAP), N,N-diethyl amino ethanol and amino ethanol; acids such as oleic acid, adipic acid and glutaric acid; anhydrides such as succinic anhydrides, phthalic anhydrides and maleic anhydrides; and phosphines such as triphenylphosphine (TPP).

Thermal curing initiators or catalyst can also be used alone or in combination in the graphene paste, including, for example, 1,1' azobis (cyclohexanecarbonitrile), azobisisobutyronitrile (AIBN), 2,2'-azobis(2-methylbutyronitrile), 2,2'-azobis(2-methylpropionamidine) dihydrochloride, dicumyl peroxide, benzoyl peroxide, tert-butyl peroxide and combinations of one or more of the foregoing.

Suitable photoinitiators or catalysts include commercially available Irgacure 184 (1-hydroxy-cyclohexyl-phenyl-ketone), Irgacure 819 (bis (2,4,6-trimethylbenzoyl)-phenylphosphineoxide), Irgacure 1850 (a 50/50 mixture of bis(2,6-dimethoxybenzoyl)-2,4,4-trimethylpentyl-phosphine oxide and 1-hydroxy-cyclohexyl-phenyl-ketone), Darocur MBF (pheny glyoxylic acid methyl ester), Darocur 4265 (a 50/50 mixture of bis(2,4,6-trimethylbenzoyl)-phenylphosphine-oxide), Irgacure 2022 (a mixture of Irgacure 819 (phosphine oxide, phenyl bis(2,4,6trimethyl benzoyl)) (20 weight percentage) and Darocur 1173 (2-hydroxy-2methyl-1-phenyl-1propanone) (80 weight percentage)) and 2-hydroxy-2-methyl-1phenyl-propan-1-one), Irgacure 1700 (a 25/75 mixture of bis(2,6-dimethoxybenzoyl)-2,4,4-trimethylpentyl-phosphine oxide and 2-hydroxy-2methyl-1-phenylpropan-1one), Irgacure 907 (2-methyl-1-[4-(methylthio) phenyl]-2-morpholonopropan-1-one), Irgacure PAG 121, Irgacure 270 diphenyl iodonium hexafluorophosphate, and diphenyl iodonium nitrate.

The graphene paste compositions comprise from 0.1 to 4.3 wt % of engineered graphene flakes, from 0.8 to 5 wt % graphene and/or graphene oxide and/or reduced graphene oxide from commercially available sources, from 60 to 95 wt % solvent(s), from 0 to 10 wt % polymeric resin binder(s), from 0 to 1 wt % surfactant and additive mixtures, and from 0 to 1.5 wt % thermal or photo curing catalyst(s).

Graphene is available from commercial suppliers such as XG Sciences, Thomas Swan, Angstron Materials, Graphenea, Applied Nanotech, Graphene Supermarket, and Sigma-Aldrich or graphene oxide and reduced graphene oxide can be purchased from Abalonyx, Angstron Materials and Graphenea. These commercial graphene and graphene oxide materials can be used along with engineered graphene flakes. Alternatively, graphene and graphene oxide materials can be prepared by liquid phase exfoliation (modified Hummers' method), high-shear mixing and electrochemical exfoliation of graphite flakes and sheets, or other such materials.

Graphite is available from commercial suppliers such as Graphite India, Birla, Alfa-Aesar, Timrex, Sigma-Aldrich, Asbury Graphite Mill Inc. and Superior Graphite Corp. Carbon black is available from suppliers such as Cabot Corp., Asbury Graphite Mill Inc., Birla, and Imerys Graphite and Carbon. Carbon nanotubes are available from suppliers such as, Adnano Technologies, Alfa Aesar, American Elements, Haydale, Sigma-Aldrich, Sisco Research Laboratories, Thomas Swan and Tokyo Chemical Industries.

Several methods may be used in applying and processing graphene pastes, inks, coatings and films, including printing, jetting, spray deposition, aerosol, dipping, brush or roller coating, offset or gravure printing, and other roll-to-roll or sheet-to-sheet processes. The various pastes, inks, coatings, and films can be air dried, thermally dried, or cured by radiation. Several post-processing steps, including heating and/or pressing can also be carried out to improve performance.

Graphene foils, films, coatings and structures of the current invention exhibit one or more improved properties including high flexibility, increased mechanical strength, high-temperature stability, greater barrier and corrosion resistance, excellent thermal and electrical conductivity, and improved EMI shielding properties, or any combination of these properties.

A free-standing foil prepared according to the process described herein is typically designed to have the following properties:

Thickness: 0.1-500 μm
Density: 0.6-2 g·cc$^{-1}$
Electrical conductivity: 0.1-2×10$^5$ S·m$^{-1}$
Thermal conductivity: 1-400 W·m$^{-1}$K$^{-1}$
Tensile Strength: >20 MPa
Young's Modulus: >10 GPa
EMI Shielding: >20 dB Thermoformed structures, such as polymer supported graphene films and printed graphene structures on polymer films, can also be produced using the methods described herein. Thermoformed polymer supported films and structures have excellent electrical conductivity and other desirable properties such as barrier properties, and providing resistance to gas and other chemicals. The graphene foils can be highly stretchable and possess excellent electrical and thermal conductivities and EMI/RF shielding properties.

Functional coatings comprising graphene paste can be deposited on metals, plastic substrates, and carriers which exhibit desired properties as barrier or selective transmission membranes for gases and moisture. Such structures are resistant to corrosion of underlying layers, especially metals.

HVM compatible processes can also be used for producing high performance graphene that can be incorporated in a wide range of graphene-enabled which results in products that have superior performance.

Graphene enabled products such as free-standing foils, graphene films on substrates, thermoformed structures, thermoformed polymer supported films and structures can be prepared using engineered graphene. Free-standing foils can be used in applications for thermal management, EMI applications, beam strippers and as barrier membranes or films. Graphene films on substrates can be used in EMI applications for thermal management applications, formable and stretchable applications, sensors, molded interconnect devices (MID), parts for the automotive industry, white-goods, and as barrier films and coatings to prevent corrosion from gas and chemicals. The substrates can be polymer, metal, ceramic and combinations thereof.

The method described herein can be used to produce thermoformed structures, such as polymer supported graphene films, printed graphene structures and features on polymer films. Thermoformed polymer supported films and structures have excellent electrical conductivity and other desirable properties such as barrier properties for providing gas or chemical inertness, which may be important in certain applications. Some of the graphene foils can be made highly stretchable and possess excellent electrical and thermal conductivity, and improved EMI/RF shielding properties. The addition of nano and/or micron sized materials added to the graphene pastes enhances electrical conductivity and EMI shielding properties.

The methods described herein can be used for producing functional coatings comprising graphene paste that is deposited on metal or plastic substrates. These coatings exhibit desired properties which serve as barrier or selective transmission membranes for gases and moisture. These coatings are also resistant to corrosion of underlying metallic layers.

Graphene foils, polymer supported graphene films, and graphene formed or fabricated structures possess excellent EMI shielding properties (>20 dB), which are relevant for several applications. Thermoformed polymer supported graphene films and printed designs possess excellent adhesion and high electrical conductivity after thermoforming which are relevant for several practical applications. Functional coatings and films prepared using graphene pastes or inks on metal or plastic substrates, structures, parts and components, have barrier properties such as resistance to gas and moisture and resistance to corrosion of underlying metallic layers. These graphene pastes, inks and coatings can be used for providing protective functional coatings on parts, components and structures (metal, plastics, and ceramics) and flexible (polymer, paper, and metal foils) surfaces for barrier (gas and moisture) and corrosion protection of underlying metals, electrical circuits or other part of the component or structure. Graphene foils and films can be used for EMI shielding, high-energy beam stripper foils, as thermal heat spreader, as materials for electrodes or other structures for battery and supercapacitors, as gas and moisture barrier layers, for corrosion protection, as protective coatings for corrosion inhibition, and for high thermal conducting substrates for electronics or sensors assembly.

The method described herein is uniquely suited to enable tailoring and optimization of graphene properties in specific applications. The following nonlimiting examples are provided to describe the current invention.

I. Graphene Paste Preparation and Characterization

Several types of graphene pastes were prepared using engineered graphene flakes, solvents, polymeric binders and additives which are described in Examples 1-21. The viscosity of the graphene paste formulations were measured using a Brookfield Cone and Plate Viscometer, model HB DV-III Ultra with CP51 spindle. All viscosity measurements were carried out at 5 rpm at 25.1° C. The temperature was controlled using a Brookfield TC-502 digital temperature controller.

a) Graphene Paste: Type A (Examples 1-16)

Graphene pastes were prepared by mixing engineered graphene flakes (5-15 wt %) in solvents (60-95 wt %) such as N,N-dimethyl formamide, N-methyl 2-pyrrolidone, N-ethyl 2-pyrrolidone, cyclohexanone; diols such as ethylene glycol, propylene glycol, dipropylene glycol, triethylene glycol 1,3-butane diol, 2,5-dimethyl-2,5-hexane diol; glycol ethers such as ethylene glycol monobutyl ether, diethylene glycol mono-n-butyl ether, propylene glycol n-propyl ether, terpineol, butyl carbitol acetate, glycol ether acetates, carbitol acetate, propylene carbonate, and Cyrene™.

Water can also be used either exclusively or as the primary solvent in the graphene paste composition. If the paste comprises water, the water should be free of any charged ions and/or impurities. For example, the water may be demineralized water, deionized water, Nanopure water, Millipore water or Milli-Q water.

Polymers or a mixture of diverse types of polymeric resin binders (0-10 wt %) such as polyester, polyacrylate, polyurethane, polyether, and polyimide backbones (eg. LEN-HB, PKHW-34, PKHW-35, PKHW-36, PKHA, PKHS-40, PKHM-85, PKHB-100, PKHP-80, SER-10, Araldite CY 205, Ebecryl 3708, bisphenol A-ethoxylate dimethacrylate, isobornyl acrylate, bisphenol A glycerolate diacrylate, bisphenol A ethylene glycol dimethacrylate, photomer 4810, N-vinyl-pyrrolidone were added to the paste and the mixtures were homogenized.

Ionic, nonionic and mixed surfactants (0-1 wt %) including SPAN-80, SPAN-20, Tween-80, TritonX-100, Sorbitan, IGEPAL-CA-630, Nonidet P-40, Cetyl alcohol, FS-3100, FS-2800, FS-2900. FS-230 and FS-30 can also be included in the paste composition.

Thermal curing initiators or catalysts (0-1.5 wt %) such as butyl amine, triethylene tetramine (TETA), 2,4,6-triaminopyrimidine, N,N-diethyl amino ethanol, oleic acid, adipic acid, glutaric acid, succinic anhydrides, phthalic anhydrides and maleic anhydrides can be added to the paste composition. Examples of useful compounds include triphenylphosphine (TPP), 1,1' azobis (cyclohexanecarbonitrile), azobisisobutyronitrile (AIBN), 2,2'-azobis(2-methylbutyronitrile), 2,2'-azobis(2-methylpropionamidine) dihydrochloride, dicumyl peroxide, benzoyl peroxide, tert-butyl peroxide, Irgacure 184 (1-hydroxy-cyclohexyl-phenyl-ketone), Irgacure 819 (bis (2,4,6-trimethylbenzoyl)-phenylphosphineoxide), Irgacure 1850 (a 50/50 mixture of bis(2,6-dimethoxybenzoyl)-2,4,4trimethylpentyl-phosphine oxide and 1-hydroxy-cyclohexyl-phenyl-ketone), Darocur MBF (pheny glyoxylic acid methyl ester), Darocur 4265 (a 50/50 mixture of bis(2,4,6-trimethylbenzoyl)-phenylphosphine-oxide, Irgacure 2022 (a mixture of IrgacureR819 (phosphine oxide, phenyl bis(2,4,6-trimethyl benzoyl)) (20 weight percentage), Darocur 1173 (2-hydroxy-2methyl-1-phenyl-1propanone) (80 weight percentage)) and 2-hydroxy-2-methyl-1phenyl-propan-1-one), Irgacure 1700 (a 25/75 mixture of bis(2,6-dimethoxybenzoyl)-2,4,4-trimethylpentyl-phosphine oxide and 2-hydroxy-2-methyl-1-phenyl-propan-1-one), and Irgacure 907 (2-methyl-1-[4-(methylthio)phenyl]-2-morpholonopropan-1-one) can also be added to the paste composition.

The compositions were homogenized using a three-roll mill consisting of chrome plated steel rolls.

EXAMPLE 1

Graphene pastes were prepared by mixing engineered graphene flakes (5-15 wt %) in N-ethyl 2-pyrrolidone (85-95 wt %). The mixtures were homogenized using a three-roll mill consisting of chrome plated steel rolls. Viscosities of these pastes were analyzed and found to be in the range of 5000 to 20000 cP.

EXAMPLE 2

Graphene pastes were prepared by mixing engineered graphene flakes (5-15 wt %) in N-methyl 2-pyrrolidone (85-95 wt %). The mixtures were homogenized using a three-roll mill consisting of chrome plated steel rolls. Viscosities of these pastes were analyzed and found to be in the range of 5000 to 20000 cP.

EXAMPLE 3

Graphene pastes were prepared by mixing engineered graphene flakes (5-15 wt %) in 2-gamma butyrolactone (85-95 wt %). The mixtures were homogenized using a three-roll mill consisting of chrome plated steel rolls. Viscosities of these pastes were analyzed and found to be in the range of 5000 to 20000 cP.

EXAMPLE 4

Graphene pastes were prepared by mixing engineered graphene flakes (5-15 wt %) in N-ethyl 2-pyrrolidone (85-95 wt %), with surfactant and additive mixtures including SPAN-80, FS-3100, Ceratix 8466, Cerafak 110, BYK054 and BYK077 (0.1-1 wt %). The mixtures were homogenized using a three-roll mill consisting of chrome plated steel rolls. Viscosities of these pastes were analyzed and found to be in the range of 10000 to 40000 cP.

EXAMPLE 5

Graphene pastes were prepared by mixing engineered graphene flakes (5-15 wt %) in N-methyl 2-pyrrolidone (85-95 wt %), with surfactant and additive mixtures such as SPAN-80, FS-3100, Ceratix 8466, Cerafak 110, BYK054 and BYK077 (0.1-1 wt %). The mixtures were homogenized using a three-roll mill consisting of chrome plated steel rolls. Viscosities of these pastes were analyzed and found to be in the range of 10000 to 40000 cP.

EXAMPLE 6

Graphene pastes were prepared by mixing engineered graphene flakes (5-15 wt %) in 2-gamma butyrolactone (85-95 wt %), with surfactant and additive mixtures including SPAN-80, FS-3100, Ceratix 8466, Cerafak 110, BYK054 and BYK077 (0.1-1 wt %). The mixtures were homogenized using a three-roll mill consisting of chrome plated steel rolls. Viscosities of these pastes were analyzed and found to be in the range of 10000 to 40000 cP.

EXAMPLE 7

Graphene pastes were prepared by mixing engineered graphene flakes (5-12 wt %) in N-methyl 2-pyrrolidone (80-95 wt %) with polymeric resin CY205 (0.03-0.4 wt %), thermal curing catalyst TPP (0.01-0.02 wt %) and surfactant and additive mixtures including SPAN-80, FS-3100, Ceratix 8466, Cerafak 110, BYK054 and BYK077 (0-1 wt %). The mixtures were homogenized using a three-roll mill consisting of chrome plated steel rolls. Viscosities of these pastes were analyzed and found to be in the range of 15000 to 20000 cP.

EXAMPLE 8

Graphene pastes were prepared by mixing engineered graphene flakes (5-12 wt %) in N-methyl 2-pyrrolidone (80-95 wt %) with polymeric resin CY205 (0.4-0.7 wt %), thermal curing catalyst TPP (0.03-0.06 wt %) and surfactant and additive mixtures including SPAN-80, FS-3100, Ceratix 8466, Cerafak 110, BYK054 and BYK077 (0-1 wt %). The mixtures were homogenized using a three-roll mill consisting of chrome plated steel rolls. Viscosities of these pastes were analyzed and found to be in the range of 20000 to 25000 cP.

EXAMPLE 9

Graphene pastes were prepared by mixing engineered graphene flakes (5-12 wt %) in N-methyl 2-pyrrolidone (80-95 wt %) with polymeric resin such as Ebecryl 3708 (0.4-0.7 wt %), thermal curing catalyst 1,1' azobis (cyclohexanecarbonitrile) (0.01-0.04 wt %), and surfactant and additive mixtures including SPAN-80, FS-3100, Ceratix 8466, Cerafak 110, BYK054 and BYK077 (0-1 wt %). The mixtures were homogenized using a three-roll mill consisting of chrome plated steel rolls. Viscosities of these pastes were analyzed and found to be in the range of 20000 to 25000 cP.

EXAMPLE 10

Graphene pastes were prepared by mixing engineered graphene flakes (5-12 wt %) in N-methyl 2-pyrrolidone (80-95 wt %) with polymeric resin Ebecryl 3708 (0.6-2.4 wt %), thermal curing catalyst 1,1' azobis (cyclohexanecarbonitrile) (0.05-0.1 wt %), and surfactant and additive mixtures including SPAN-80, FS-3100, Ceratix 8466, Cerafak 110, BYK054 and BYK077 (0-1 wt %). The mixtures were homogenized using a three-roll mill consisting of chrome plated steel rolls. Viscosities of these pastes were analyzed and found to be in the range of 25000 to 30000 cP.

EXAMPLE 11

Graphene pastes were prepared by mixing engineered graphene flakes (5-12 wt %) in N-ethyl 2-pyrrolidone (80-95 wt %) with polymeric resin Ebecryl 3708 (1.5-5 wt %), and surfactant and additive mixtures including SPAN-80, FS-3100, Ceratix 8466, Cerafak 110, BYK054 and BYK077 (0-1 wt %). The mixtures were homogenized using a three-roll mill consisting of chrome plated steel rolls. Viscosities of these pastes were analyzed and found to be in the range of 25000 to 40000 cP.

EXAMPLE 12

Graphene pastes were prepared by mixing engineered graphene flakes (5-15 wt %) in N-ethyl 2-pyrrolidone (80-95 wt %) with polymeric resin Ebecryl 3708 (2-6 wt %) and surfactant and additive mixtures including SPAN-80, FS-3100, Ceratix 8466, Cerafak 110, BYK054 and BYK077 (0-1 wt %). The mixtures were homogenized using a three-roll mill consisting of chrome plated steel rolls. Viscosities of these pastes were analyzed and found to be in the range of 25000 to 40000 cP.

EXAMPLE 13

Graphene pastes were prepared by mixing engineered graphene flakes (5-15 wt %) in 2-gamma butyrolactone (60-90 wt %) with polymeric resin Ebecryl 3708 (3-8.5 wt %), thermal curing catalyst 1,1' azobis (cyclohexanecarbonitrile) (0.5-1.5 wt %) and surfactant and additive mixtures including SPAN-80, FS-3100, Ceratix 8466, Cerafak 110, BYK054 and BYK077 (0-1 wt %). The mixtures were homogenized using a three-roll mill consisting of chrome plated steel rolls. Viscosities of these pastes were analyzed and found to be in the range of 30000 to 80000 cP.

EXAMPLE 14

Graphene pastes were prepared by mixing engineered graphene flakes (5-15 wt %) in 2-gamma butyrolactone (60-90 wt %) with polymeric resin Ebecryl 3708 (1.5-5 wt %), thermal curing catalyst 1,1' azobis (cyclohexanecarbonitrile (0.1-0.3%) and surfactant and additive mixtures including SPAN-80, FS-3100, Ceratix 8466, Cerafak 110, BYK054 and BYK077 (0-1 wt %). The mixtures were homogenized using a three-roll mill consisting of chrome plated steel rolls. Viscosities of these pastes were analyzed and found to be in the range of 25000 to 40000 cP.

EXAMPLE 15

Graphene pastes were prepared by mixing engineered graphene flakes (5-15 wt %) in N-ethyl 2-pyrrolidone (80-95 wt %) with polymeric resin Ebecryl 3708 (2-6 wt %), thermal curing catalyst 1,1' azobis (cyclohexanecarbonitrile) (0.1-0.3 wt %), and surfactant and additive mixtures including SPAN-80, FS-3100, Ceratix 8466, Cerafak 110, BYK054 and BYK077 (0-1 wt %). The mixtures were homogenized using a three-roll mill consisting of chrome plated steel rolls. Viscosities of these pastes were analyzed and found to be in the range of 30000 to 80000 cP.

EXAMPLE 16

Graphene pastes were prepared by mixing engineered graphene flakes (3-15 wt %) in N-ethyl 2-pyrrolidone (80-93 wt %) with thermoplastic polyimide resin BR720 (0.01-0.1 wt %), and surfactant and additive mixtures including SPAN-80, FS-3100, Ceratix 8466, Cerafak 110, BYK054 and BYK077 (0-1 wt %). The mixtures were homogenized using a three-roll mill consisting of chrome plated steel rolls. Viscosities of these pastes were analyzed and found to be in the range of 15000 to 20000 cP.

b) Graphene Paste: Type B (Examples 17-21)

Graphene pastes were prepared by mixing engineered graphene flakes (0.1-4.3 wt %) with graphene oxide (0.8-5 wt %). These mixtures of graphene were then added to solvents (60-95 wt %) including N,N-dimethyl formamide, N-methyl 2-pyrrolidone, N-ethyl 2-pyrrolidone, gamma butyrolactone cyclohexanone; diols such as ethylene glycol, propylene glycol, dipropylene glycol, triethylene glycol, 1,3-butane diol, 2,5-dimethyl-2,5-hexane diol; and glycol ethers such as ethylene glycol monobutyl ether, diethylene glycol mono-n-butyl ether, propylene glycol n-propyl ether, terpineol, butyl carbitol acetate, glycol ether acetates, carbitol acetate, propylene carbonate, and Cyrene™.

Water can also be used either exclusively or as the primary solvent, for graphene paste. If the paste comprises water, the water should be free of any charged ions and/or impurities. For example, the water may be demineralized water, deionized water, Nanopure water, Millipore water or Milli-Q water.

Polymers or mixtures of diverse types of polymeric resin binders (0-10 wt %) such as polyester, polyacrylate, polyurethane, polyether, and polyamide backbones (eg. LEN-HB, PKHW-34, PKHW-35, PKHW-36, PKHA, PKHS-40, PKHM-85, PKHB-100, PKHP-80, SER-10, Araldite CY 205, Ebecryl 3708, bisphenol A-ethoxylate dimethacrylate, isobornyl acrylate, bisphenol A glycerolate diacrylate, bisphenol A ethylene glycol dimethacrylate, photomer Ph 4810, and N-vinylpyrrolidone) were also added and the mixtures were homogenized.

Ionic, nonionic or mixed surfactants (0-1 wt %) such as SPAN-80, SPAN-20, Tween-80, Triton-X-100, Sorbitan, IGEPAL-CA-630, Nonidet P-40, Cetyl alcohol, FS-3100, FS-2800, FS-2900. FS-230 and FS-30 can also be added to the paste composition.

Thermal curing initiators or catalysts (0-1.5 wt %) such as, butyl amine, triethylene tetramine (TETA), 2,4,6-triaminopyrimidine, N,N-diethyl amino ethanol, oleic acid, adipic acid, glutaric acid, succinic anhydrides, phthalic anhydrides and maleic anhydrides. Useful initiators and catalysts include triphenylphosphine (TPP); 1,1' azobis (cyclohexanecarbonitrile), azobisisobutyronitrile (AIBN), 2,2'-azobis(2-methylbutyronitrile), 2,2'-azobis(2methylpropionamidine) dihydrochloride, dicumyl peroxide, benzoyl peroxide, tertbutyl peroxide, Irgacure 184 (1-hydroxy-cyclohexyl-phenyl-ketone), Irgacure 819 (bis (2,4,6-trimethylbenzoyl)-phenylphosphineoxide), Irgacure 1850 (a 50/50 mixture of bis(2,6-dimethoxybenzoyl)-2,4,4-trimethylpentyl-phosphine oxide and 1-hydroxy-cyclohexyl-phenyl-ketone), Darocur MBF (pheny glyoxylic acid methyl ester), Darocur 4265 (a 50/50 mixture of bis(2,4,6-trimethylbenzoyl)-phenylphosphine-oxide, Irgacure 2022 (a mixture of IrgacureR819 (phosphine oxide, phenyl bis(2,4,6-trimethyl benzoyl)) (20 weight percentage), Darocur 1173 (2-hydroxy-2methyl-1-phenyl-1-propanone) (80 weight percentage)) and 2hydroxy-2methyl-1phenyl-propan-1-one), Irgacure 1700 (a 25/75 mixture of bis(2,6-dimethoxybenzoyI)-2,4,4-trimethylpentyl-phosphine oxide and 2-hydroxy-2-methyl-1-phenylpropan-1-one), and Irgacure 907 (2-methyl-1-[4-(methylthio)phenyl]-2morpholonopropan-1-one) can also be added.

The paste compositions were homogenized using a three-roll mill consisting of chrome plated steel rolls.

EXAMPLE 17

Graphene pastes were prepared by mixing engineered graphene flakes (0.1-0.5 wt %) with graphene oxide (4.6-5 wt %) in N-ethyl 2-pyrrolidone (83-95 wt %) along with surfactant and additive mixtures including SPAN-80, FS-3100, Ceratix 8466, Cerafak 110, BYK054 and BYK077 (0.1-1 wt %). The compositions were homogenized using a three-roll mill consisting of chrome plated steel rolls. Viscosities of these pastes were analyzed and found to be in the range of 60000 to 80000 cP.

EXAMPLE 18

Graphene pastes were prepared by mixing engineered graphene flakes (0.6-1 wt %) with graphene oxide (4.1-4.6 wt %) in N-ethyl 2-pyrrolidone (83-95 wt %) along with surfactant and additive mixtures including SPAN-80, FS-3100, Ceratix 8466, Cerafak 110, BYK054 and BYK077 (0.1-1 wt %). The compositions were homogenized using a three-roll mill consisting of chrome plated steel rolls. Viscosities of these pastes were analyzed and found to be in the range of 40000 to 60000 cP.

EXAMPLE 19

Graphene pastes were prepared by mixing engineered graphene flakes (2-3.1 wt %) with graphene oxide (2-3.1 wt %) in N-ethyl 2-pyrrolidone (83-95 wt %) along with surfactant and additive mixtures including SPAN-80, FS-3100, Ceratix 8466, Cerafak 110, BYK054 and BYK077 (0.1-1 wt %). The compositions were homogenized using a three-roll mill consisting of chrome plated steel rolls. Viscosities of these pastes were analyzed and found to be in the range of 30000 to 50000 cP.

EXAMPLE 20

Graphene pastes were prepared by mixing engineered graphene flakes (3.6-4.3 wt %) with graphene oxide (0.8-1.5 wt %) in N-ethyl 2-pyrrolidone (83-95 wt %) along with surfactant and additive mixtures including SPAN-80, FS-3100, Ceratix 8466, Cerafak 110, BYK054 and BYK077 (0.1-1 wt %). The compositions were homogenized using a three-roll mill consisting of chrome plated steel rolls. Viscosities of these pastes were analyzed and found to be in the range of 10000 to 40000 cP.

EXAMPLE 21

Graphene pastes were prepared by mixing engineered graphene flakes (0.1-0.5 wt %) with graphene oxide (4.6-5 wt %) in N-ethyl 2-pyrrolidone (80-95 wt %) along with polymeric resin Ebecryl 3708 (2-6 wt %), thermal curing catalyst 1,1' azobis (cyclohexanecarbonitrile) (0.5-1.5 wt %) and surfactant and additive mixtures including SPAN-80, FS-3100, Ceratix 8466, Cerafak 110, BYK054 and BYK077 (0-1 wt %). The mixtures were homogenized using a three-roll mill consisting of chrome plated steel rolls. Viscosities of these pastes were analyzed and found to be in the range of 40000 to 70000 cP.

II. Graphene Foils Preparation and Characterization
a) Free-Standing Graphene Foil Preparation Graphene foils F1-F42 were prepared by stencil printing graphene pastes (Examples 1-21) on glass slides (3 mm to 5 mm thick) or aluminum foils (thicknesses ranging from 5 to 80 μm) either manually or with an automatic stencil printer (DEK Horizon screen printer). Graphene pastes were also printed on other polymer substrates, including polycarbonates (PC), polyethylene terephthalate (PET) and polyimide (PI).

The prepared graphene film thicknesses were controlled by limiting the deposits of graphene paste using appropriate sized stencils. Larger sized free-standing graphene foils were prepared using semi-automatic film coater from MTI Corporation. Graphene pastes printed on various substrates were dried in a hot-air oven between 150-250° C. under ambient conditions and free-standing graphene foils were obtained/released by gently immersing the graphene printed substrate in warm water (40-80° C.).

The graphene foils have a thickness between about 0.1 and about 500 μm and preferably between about 1 and about 100 μm.

b) Post-Processing of Free-Standing Graphene Foils

These as prepared graphene foils were then mechanically compacted by placing them in between a pair of ultra-smooth stainless-steel plates and by applying pressures ranging from 1 MPa to 100 MPa at 25-150° C. in ambient atmosphere using a laboratory press (Carver press). Some foils were also pressed using laboratory roll-press. Additionally, some of the foils were thermally annealed at 500-1000° C. in a tube furnace, under a nitrogen atmosphere or were thermally annealed at 500-3000° C. in a high-temperature furnace or in a graphite induction furnace in argon or forming gas atmosphere (argon and hydrogen mixture). For comparison, these high-temperature annealed, free-standing graphene foils were also further mechanically compacted at 1-100 MPa and 25-150° C. in ambient atmosphere using a laboratory press (Carver press) or roll-press.

c) Characterization of Free-Standing Graphene Foils

Free-standing graphene foils were characterized using various methods such as Powder X-ray diffraction (PXRD), Raman Spectroscopy, Field-Emission Scanning Electron Microscopy (FESEM) and Energy dispersive analysis of X-rays (EDAX). Also thickness and density of these foils are measured to accurately estimate thermal, electrical and mechanical properties.

i) Powder X-Ray Diffraction

Powder XRD patterns of the graphene foils were recorded with a Rigaku Smartlab X-ray Diffractometer operating at 40 kV and 30 mA CuKα radiation with a wavelength of 1.54 A and a step size of 0.02° in the 2θ range between 5°-70°.

ii) Raman Characterization

Raman spectra of these graphene foils were recorded with Horiba Tobin Yvon LabRAM HR evolution Raman spirometer equipped with 632 nm He—Ne Laser.

iii) Field-Emission Scanning Electron Microscopy and EDAX

FESEM Model: JEOL JSM-7800F Prime was used for microscopic imaging of graphene foils and corresponding cross-sectional analysis. EDS (Energy Dispersive Spectra) analysis was carried out using EDAX Genesis.

iv) Thickness and Density Measurements

Average thicknesses of these graphene foils were determined using a CDI (Chicago Dial Indicator) thickness gauge or Mitutoyo digital micrometer, by measuring the thickness of the foil at 5-6 spots. To measure density, a piece of a graphene foil having 2 cm×2 cm area was taken and weighed using a Mettler Toledo weighing balance with sensitivity of up to 5 decimal places. The volume of the piece was calculated by multiplying the thickness value obtained from the thickness gauge/micrometer with its length and width. The density was then calculated by taking the ratio of the weight and volume of the sample piece.

v) Measurement of Electrical, Thermal, Mechanical and EMI Shielding Properties

Electrical, thermal and mechanical properties of several free-standing graphene foils have been investigated and results are summarized in Table 2, 3 and FIG. 6-8. EMI shielding effectiveness of select graphene foils have been studied and are shown in FIG. 9.

vi) Electrical Characterization of Graphene Foils

The electrical conductivity, resistivity and sheet resistance of the graphene foils were measured using a four-probe method. Measurements were carried out using an Agilent 34411A multimeter. Graphene foils were cut into rectangular strips (5 mm×20 mm) and their thicknesses were determined using a Mitutoyo Digital Micrometer. Samples were mounted on an FR4-PCB board and clamped in place. The outer pads on FR4-PCB board act as a current source and the inner pads are the voltage pads fixed at a distance of 10 mm from each other ensuring a resistor length of 10 mm. Wires soldered on the pads were connected to the Agilent 34411A multimeter to measure the resistance. Using the resistance value and dimensions of the film, the bulk resistivity ($\rho$), sheet resistance ($R_s$) and electrical conductivity (C) were obtained using the formula given below:

Bulk resistivity, $\rho = R \times A/l$,
Sheet resistance, $Rs = R \times W/l$
R=Resistance of the foil
A=width (W)×thickness (t) (of foil)
l=length of foil
W=width of foil
Electrical conductivity $(\sigma) = 1/\rho$ FIG. 6 shows the typical electrical conductivity values obtained for graphene foils subjected to different processing conditions. Table 2 summarizes the electrical conductivity values obtained for various types of foils. The measurements indicate that higher annealing temperatures improve the electrical conductivity of these graphene foils.

The graphene foils of the current invention have electrical conductivity between about $1 \times 10^2$ S/m and about $3 \times 10^5$ S/m and preferably between about $2 \times 10^2$ S/m and about $2 \times 10^5$ S/m.

vii) Thermal Characterization of Graphene Foils

The in-plane thermal diffusivity of the graphene foils was measured using a Netzsch Laser Flash Apparatus (LFA-447). A special in-plane sample holder was used that directs the thermal energy along the sample giving the corresponding in-plane thermal diffusivity values ($\alpha$). The samples were cut into an appropriate size and placed into a special stage and sample holder. The thermal conductivity (K) is obtained from the equation given below:

$$K = \rho \alpha C_p$$

where $\rho$ is the apparent mass density of the graphene film and $C_p$ is the specific heat capacity of the film. Specific heat capacity of graphene foil is known to be 0.71 J/g/° C. The graphene foils of the current invention have thermal conductivity between about 1 and about 400 W/m·K and more preferably between 10 and 200 W/m·K.

FIGS. 7(a and b) shows the typical thermal diffusivity and conductivity values obtained for graphene foils subjected to different processing conditions. Table 2 summarizes the thermal diffusivity and thermal conductivity values obtained for various types of foils. The measurements indicate that higher annealing temperatures result in higher thermal diffusivity and thermal conductivity values.

viii) Mechanical Characterization of Graphene Foils

Tensile strength and Young's Modulus of the graphene films were measured using a Dynamic Mechanical Analyser (TA Instruments Q 800) coupled with a film tension clamp. Graphene films were cut into rectangular strips (5 mm×20 mm) and the thickness was determined using a Mitutoyo Digital Micrometer. The films were clamped between a fixed and movable holder system. The stress-strain curve was monitored in the controlled force mode and the tensile strength and Young's Modulus were obtained from the resulting graph.

The graphene foils of the current invention have a tensile strength greater than 20 MPa and Young's Modulus greater than 5 GPa and preferably a tensile strength greater than 30 MPa and Young's Modulus greater than 10 GPa.

FIGS. 8(a and b) shows typical tensile strength and Young's Modulus values obtained for graphene foils subjected to different processing conditions and Table 3 summarizes the tensile strength and Young's Modulus values obtained for graphene foils subjected to various types of processing conditions. It was observed that compressing the graphene foils improves their mechanical strength significantly.

ix) EMI Shielding Properties of Graphene Foils

EMI shielding effectiveness of free-standing graphene foils was tested in the 200 Mhz-2.5 Ghz frequency range. Graphene foils were mounted on the transmission aperture using a non conducting tape. Good electrical contact between the film and the ground is important for effective shielding. Transmission and receiver antenna were set at 80 cm distance from the aperture. A +30 dB Pre-Amp was used. FIG. 9 shows the EMI shielding effectiveness of graphene foil F7 (see table 2) with different thicknesses.

To investigate the EMI shielding performance in L band (1-2 GHz), graphene foils of different thicknesses were mounted on the transmission aperture using a nonconducting tape. It was found that the 15 μm thick F7 type foil results in a better EMI shielding effectiveness than 10 μm thick F7 type foils. The EMI shielding effectiveness of the 15 μm graphene foil is as high as 40 dB, which meets the requirements for practical applications and is comparable with millimeter thick graphene-polymer composite materials. In general, shielding effectiveness is found to be better at high frequencies. 15 mm film is 3-4 dB better than a 10 mm film. Putting two films together does not improve shielding, likely due to poor electrical contact.

x) Thermoforming of Polymer Supported Graphene Film

Graphene pastes were stencil printed in the form of lines on formable PET sheets to demonstrate thermoforming of polymer supported graphene films. For example, graphene paste Example 5 was stencil printed on PET sheets by manual stencil printer and were air dried at 70-150° C. for 10 minutes to 120 minutes. Some of the graphene printed sheets were further compressed using a roll press with a gap setting of 1-14 mm at room temperature for 30 seconds to 2 minutes.

Both the un-pressed and pressed graphene printed PET sheets were thermoformed using a home assembled semi-auto vacuum-forming machine with a forming depth of 0.25 to 1 inches. FIG. 10 depicts thermoforming of graphene lines printed on PET sheets and their flexible nature. Resistance of the graphene lines on the PET sheets were measured with a portable multimeter before and after thermoforming. The typical resistance values of these heated and pressed graphene printed lines (28 cm×0.1 cm×0.001 cm) are 1-3 kΩ and shows insignificant (~5-10%) increase in resistance after thermoforming.

III. Description of Graphene Foils

Graphene Foil F1:

Graphene paste (Example 1) was stencil printed on glass slides using a manual stencil printer with 8 mil stencil (rectangular aperture of 1"×2.6") and dried in a hot-air oven at 70-250° C. under ambient conditions for 1-4 hours. Free-standing graphene foils were obtained by gently immersing the graphene printed substrate in warm water (40-80° C.) and subsequently air dried.

Graphene Foil F2:

Graphene paste (Example 1) was stencil printed on glass slides using a manual stencil printer with 8 mil stencil (rectangular aperture of 1"×2.6") and dried in a hot-air oven at 70-250° C. under ambient conditions for 1-4 hours. Free-standing graphene foils were obtained by gently immersing the graphene printed substrate in warm water (40-80° C.) and subsequently air dried. These foils were further heat treated at 1500° C. for 2-12 hours under nitrogen atmosphere in a high-temperature furnace.

Graphene Foil F3:

Graphene paste (Example 2) was stencil printed on glass slides using a manual stencil printer with 8 mil stencil (rectangular aperture of 1"×2.6") and dried in a hot-air oven at 70-250° C. under ambient conditions for 1-4 hours. Free-standing graphene foils were obtained by gently immersing the graphene printed substrate in warm water (40-80° C.) and subsequently air dried.

Graphene Foil F4:

Graphene paste (Example 3) was stencil printed on glass slides using a manual stencil printer with 8 mil stencil (rectangular aperture of 1"×2.6") and dried in a hot-air oven at 70-250° C. under ambient conditions for 1-4 hours. Free-standing graphene foils were obtained by gently immersing the graphene printed substrate in warm water (40-80° C.) and subsequently air dried.

Graphene Foil F5:

Graphene paste (Example 4) was stencil printed on glass slides using a manual stencil printer with 8 mil stencil (rectangular aperture of 1"×2.6") and dried in a hot-air oven at 70-250° C. under ambient conditions for 1-4 h. Free-standing graphene foils were obtained by gently immersing the graphene printed substrate in warm water (40-80° C.) and subsequently air dried.

Graphene Foil F6:

Graphene paste (Example 5) was stencil printed on glass slides using a semi-automatic stencil printer (DEK) with 16 mil stencil (rectangular aperture of 1"×2.6") and dried in a hot-air oven at 70-250° C. under ambient conditions for 1-4 hours. Free-standing graphene foils were obtained by gently immersing the graphene printed substrate in warm water (40-80° C.) and subsequently air dried.

Graphene Foil F7:

Graphene paste (Example 5) was stencil printed on glass slides using a semi-automatic stencil printer (DEK) with 16 mil stencil (rectangular aperture of 1"×2.6") and dried in a hot-air oven at 70-250° C. under ambient conditions for 1-4 hours. Free-standing graphene foils were obtained by gently immersing the graphene printed substrate in warm water (40-80° C.) and subsequently air dried.

The prepared graphene foils were then mechanically compacted by placing them in between a pair of ultra-smooth stainless-steel plates and by applying 5 MPa pressure for 10-120 minutes in ambient atmosphere using a laboratory press (Carver press).

Graphene Foil F8:

Graphene paste (Example 5) was stencil printed on glass slides using a semi-automatic stencil printer (DEK) with 16 mil stencil (rectangular aperture of 1"×2.6") and dried in a hot-air oven at 70-250° C. under ambient conditions for 1-4 hours. Free-standing graphene foils were obtained by gently immersing the graphene printed substrate in warm water (40-80° C.) and subsequently air dried.

The prepared graphene foils were then mechanically compacted by placing them in between a pair of ultra-smooth stainless-steel plates and by applying 5 MPa pressure for 10-120 minutes in ambient atmosphere using a laboratory press (Carver press). These foils were further heat treated at 1000° C. for 2-12 hours under nitrogen atmosphere in a tube furnace.

Graphene Foil F9:

Graphene paste (Example 5) was stencil printed on glass slides using a semi-automatic stencil printer (DEK) with 16 mil stencil (rectangular aperture of 1"×2.6") and dried in a hot-air oven at 70-250° C. under ambient conditions for 1-4 hours. Free-standing graphene foils were obtained by gently immersing the graphene printed substrate in warm water (40-80° C.) and subsequently air dried.

The prepared graphene foils were then mechanically compacted by placing them in between a pair of ultra-smooth stainless-steel plates and by applying 5 MPa pressure for 10-120 minutes in ambient atmosphere using a laboratory press (Carver press). These foils were further heat treated at 1500° C. for 2-12 hours under nitrogen atmosphere in a high-temperature furnace.

Graphene Foil F10:

Graphene paste (Example 5) was stencil printed on glass slides using a semi-automatic stencil printer (DEK) with 16 mil stencil (rectangular aperture of 1"×2.6") and dried in a hot-air oven at 70-250° C. under ambient conditions for 1-4 hours. Free-standing graphene foils were obtained by gently immersing the graphene printed substrate in warm water (40-80° C.) and subsequently air dried.

These foils were further heat treated at 1000° C. for 2-12 hours under nitrogen atmosphere in a tube furnace.

Graphene Foil F11:

Graphene paste (Example 5) was stencil printed on glass slides using a semi-automatic stencil printer (DEK) with 16 mil stencil (rectangular aperture of 1"×2.6") and dried in a hot-air oven at 70-250° C. under ambient conditions for 1-4 hours. Free-standing graphene foils were obtained by gently immersing the graphene printed substrate in warm water (40-80° C.) and subsequently air dried.

These foils were further heat treated at 1500° C. for 2-12 hours under nitrogen atmosphere in a high-temperature furnace.

Graphene Foil F12:

Graphene paste (Example 5) was stencil printed on glass slides using a semi-automatic stencil printer (DEK) with 16 mil stencil (rectangular aperture of 1"×2.6") and dried in a hot-air oven at 70-250° C. under ambient conditions for 1-4 hours. Free-standing graphene foils were obtained by gently immersing the graphene printed substrate in warm water (40-80° C.) and subsequently air dried.

These foils were further heat treated at 1000° C. for 2-12 hours under nitrogen atmosphere in a high-temperature furnace. Further, these heat-treated graphene foils were mechanically compacted by placing them in between a pair of ultra-smooth stainless-steel plates and by applying 5 MPa pressure for 10-120 minutes in ambient atmosphere using a laboratory press (Carver press).

Graphene Foil F13:

Graphene paste (Example 5) was stencil printed on glass slides using a semi-automatic stencil printer (DEK) with 16 mil stencil (rectangular aperture of 1"×2.6") and dried in a hot-air oven at 70-250° C. under ambient conditions for 1-4 hours. Free-standing graphene foils were obtained by gently immersing the graphene printed substrate in warm water (40-80° C.) and subsequently air dried.

The prepared graphene foils were then mechanically compacted by placing them in between a pair of ultra-smooth stainless-steel plates and by applying 5 MPa pressure for 10-120 minutes in ambient atmosphere using a laboratory press (Carver press). Then, these foils were further heat treated at 1000° C. for 2-12 hours under nitrogen atmosphere in a tube furnace, followed by heating at 1500° C. for 2-12 hours under nitrogen atmosphere in a high-temperature furnace.

Graphene Foil F14:
Graphene paste (Example 6) was stencil printed on glass slides using a manual stencil printer with an 8 mil stencil (rectangular aperture of 1"×2.6") and dried in a hot-air oven at 70-250° C. under ambient conditions for 1-4 hours. Free-standing graphene foils were obtained by gently immersing the graphene printed substrate in warm water (40-80° C.) and subsequently air dried.

Graphene Foil F15:
Graphene paste (Example 7) was stencil printed on an aluminum foil using a manual stencil printer with a 4 mil stencil (rectangular aperture of 1"×2.6") and dried in a hot-air oven at 70-250° C. under ambient conditions for 1-4 hours. Free-standing graphene foils were obtained by gently immersing the graphene printed substrate in warm water (40-80° C.) and subsequently air dried. The prepared graphene foils were then mechanically compacted by placing them in between a pair of ultra-smooth stainless-steel plates and by applying 50 MPa pressure at 150° C. for 10-120 minutes in ambient atmosphere using a laboratory press (Carver press).

Graphene Foil F16:
Graphene paste (Example 8) was stencil printed on an aluminum foil using a manual stencil printer with a 4 mil stencil (rectangular aperture of 1"×2.6") and dried in a hot-air oven at 70-250° C. under ambient conditions for 1-4 h. Free-standing graphene foils were obtained by gently immersing the graphene printed substrate in warm water (40-80° C.) and subsequently air dried.

Graphene Foil F17:
Graphene paste (Example 9) was stencil printed on an aluminum foil using a manual stencil printer with an 8 mil stencil (rectangular aperture of 1"×2.6") and dried in a hot-air oven at 70-250° C. under ambient conditions for 1-4 hours. Free-standing graphene foils were obtained by gently immersing the graphene printed substrate in warm water (40-80° C.) and subsequently air dried.

Graphene Foil F18:
Graphene paste (Example 9) was stencil printed on an aluminum foil using a manual stencil printer with an 8 mil stencil (rectangular aperture of 1"×2.6") and dried in a hot-air oven at 70-250° C. under ambient conditions for 1-4 hours. Free-standing graphene foils were obtained by gently immersing the graphene printed substrate in warm water (40-80° C.) and subsequently air dried. These foils were further heat treated at 1500° C. for 2-12 hours under nitrogen atmosphere in a high-temperature furnace.

Graphene Foil F19:
Graphene paste (Example 10) was stencil printed on an aluminum foil using a manual stencil printer with an 8 mil stencil (rectangular aperture of 1"×2.6") and dried in a hot-air oven at 70-250° C. under ambient conditions for 1-4 hours. Free-standing graphene foils were obtained by gently immersing the graphene printed substrate in warm water (40-80° C.) and subsequently air dried.

Graphene Foil F20:
Graphene paste (Example 10) was stencil printed on an aluminum foil using a manual stencil printer with an 8 mil stencil (rectangular aperture of 1"×2.6") and dried in a hot-air oven at 70-250° C. under ambient conditions for 1-4 hours. Free-standing graphene foils were obtained by gently immersing the graphene printed substrate in warm water (40-80° C.) and subsequently air dried. These foils were further heat treated at 1500° C. for 2-12 hours under nitrogen atmosphere in a high-temperature furnace.

Graphene Foil F21:
Graphene paste (Example 11) was stencil printed on an aluminum foil using a manual stencil printer with an 8 mil stencil (rectangular aperture of 1"×2.6") and dried in a hot-air oven at 70-250° C. under ambient conditions for 1-4 hours. Free-standing graphene foils were obtained by gently immersing the graphene printed substrate in warm water (40-80° C.) and subsequently air dried.

Graphene Foil F22:
Graphene paste (Example 11) was stencil printed on an aluminum foil using a manual stencil printer with an 8 mil stencil (rectangular aperture of 1"×2.6") and dried in a hot-air oven at 70-250° C. under ambient conditions for 1-4 hours. Free-standing graphene foils were obtained by gently immersing the graphene printed substrate in warm water (40-80° C.) and subsequently air dried. These foils were further heat treated at 1500° C. for 2-12 hours under nitrogen atmosphere in a high-temperature furnace.

Graphene Foil F23:
Graphene paste (Example 12) was stencil printed on an aluminum foil using a manual stencil printer with an 8 mil stencil (rectangular aperture of 1"×2.6") and dried in a hot-air oven at 70-250° C. under ambient conditions for 1-4 hours. Free-standing graphene foils were obtained by gently immersing the graphene printed substrate in warm water (40-80° C.) and subsequently air dried.

Graphene Foil F24:
Graphene paste (Example 12) was stencil printed on an aluminum foil using a manual stencil printer with an 8 mil stencil (rectangular aperture of 1"×2.6") and dried in a hot-air oven at 70-250° C. under ambient conditions for 1-4 hours. Free-standing graphene foils were obtained by gently immersing the graphene printed substrate in warm water (40-80° C.) and subsequently air dried. These foils were further heat treated at 1500° C. for 2-12 hours under nitrogen atmosphere in a high-temperature furnace.

Graphene Foil F25:
Graphene paste (Example 13) was stencil printed on an aluminum foil using a manual stencil printer with an 8 mil stencil (rectangular aperture of 1"×2.6") and dried in a hot-air oven at 70-250° C. under ambient conditions for 1-4 hours. Free-standing graphene foils were obtained by gently immersing the graphene printed substrate in warm water (40-80° C.) and subsequently air dried. These foils were further heat treated at 1000° C. for 2-12 h under nitrogen atmosphere in a tube furnace.

Graphene Foil F26:
Graphene paste (Example 12) was stencil printed on an aluminum foil using a manual stencil printer with an 8 mil stencil (rectangular aperture of 1"×2.6") and dried in a hot-air oven at 70-250° C. under ambient conditions for 1-4 hours. Free-standing graphene foils were obtained by gently immersing the graphene printed substrate in warm water (40-80° C.) and subsequently air dried. These foils were further heat treated at 1500° C. for 2-12 hours under nitrogen atmosphere in a high-temperature furnace.

Graphene Foil F27:
Graphene paste (Example 12) was stencil printed on an aluminum foil using a manual stencil printer with an 8 mil stencil (rectangular aperture of 1"×2.6") and dried in a hot-air oven at 70-250° C. under ambient conditions for 1-4 hours. Free-standing graphene foils were obtained by gently immersing the graphene printed substrate in warm water (40-80° C.) and subsequently air dried. These foils were further heat treated at 1900° C. for 2-12 hours under argon atmosphere in a high-temperature furnace.

Graphene Foil F28:

Graphene paste (Example 4) was stencil printed on glass slides using a manual stencil printer with an 8 mil stencil (rectangular aperture of 1"×2.6") and dried in a hot-air oven at 70-250° C. under ambient conditions for 1-4 hours. Free-standing graphene foils were obtained by gently immersing the graphene printed substrate in warm water (40-80° C.) and subsequently air dried. These foils were further heat treated at 2750° C. for 2-72 hours under argon atmosphere in a graphite induction furnace.

Graphene Foil F29:

Graphene paste (Example 4) was stencil printed on glass slides using a manual stencil printer with an 8 mil stencil (rectangular aperture of 1"×2.6") and dried in a hot-air oven at 70-250° C. under ambient conditions for 1-4 hours. Free-standing graphene foils were obtained by gently immersing the graphene printed substrate in warm water (40-80° C.) and subsequently air dried. These foils were further heat treated at 2750° C. for 2-72 hours under argon atmosphere in a graphite induction furnace. These heated treated graphene foils were then mechanically compacted by placing them in between a pair of ultra-smooth stainless-steel plates and by applying 35 MPa pressure at 150° C. for 10-120 minutes in ambient atmosphere using a laboratory press (Carver press).

Graphene Foil F30:

Graphene paste (Example 14) was stencil printed on an aluminum foil using a manual stencil printer with an 8 mil stencil (rectangular aperture of 1"×2.6") and dried in a hot-air oven at 70-250° C. under ambient conditions for 1-4 hours. Free-standing graphene foils were obtained by gently immersing the graphene printed substrate in warm water (40-80° C.) and subsequently air dried.

Graphene Foil F31:

Graphene paste (Example 15) was stencil printed on an aluminum foil using a manual stencil printer with an 8 mil stencil (rectangular aperture of 1"×2.6") and dried in a hot-air oven at 70-250° C. under ambient conditions for 1-4 hours. Free-standing graphene foils were obtained by gently immersing the graphene printed substrate in warm water (40-80° C.) and subsequently air dried.

Graphene Foil F32:

Graphene paste (Example 16) was stencil printed on an aluminum foil using a manual stencil printer with an 8 mil stencil (rectangular aperture of 1"×2.6") and dried in a hot-air oven at 70-250° C. under ambient conditions for 1-4 hours. Free-standing graphene foils were obtained by gently immersing the graphene printed substrate in warm water (40-80° C.) and subsequently air dried.

Graphene Foil F33:

Different dimension graphene foils were prepared using a semi-automatic film coater from MTI Corporation (Doctor blade coater). The graphene film thickness was controlled by adjusting the gap setting of the doctor blade between 150 and 1200 μm, while depositing wet graphene paste on the aluminum foil. Graphene paste, Example 4, was deposited on aluminum foil using the semi automatic film coater and dried in a hot-air oven at 70-250° C. under ambient conditions for 1-4 hours. Free-standing graphene foils were obtained by gently immersing the dried graphene paste printed aluminum foils in warm water (40-80° C.) and subsequently air dried.

Graphene Foil F34:

Different dimensions of graphene foils were prepared using a semi-automatic film coater from MTI Corporation (doctor blade coater). The graphene film thickness was controlled by adjusting the gap setting of the doctor blade between 150 and 1200 μm, while depositing wet graphene paste on aluminum foil. Graphene paste, Example 4, was deposited on aluminum foils using the semi-automatic film coater and dried in a hot-air oven at 70-250° C. under ambient conditions for 1-4 hours. Free-standing graphene foils were obtained by gently immersing the dried graphene paste printed aluminum foils in warm water (40-80° C.) and subsequently air dried. These foils were further heat treated at 1900° C. for 2-12 hours under argon atmosphere in a high temperature furnace.

Graphene Foil F35:

Different dimensions of graphene foils were prepared using a semi-automatic film coater from MTI Corporation (Doctor blade coater). The graphene film thicknesses were controlled by adjusting the gap setting of the doctor blade between 150 and 1200 μM, while depositing wet graphene paste on aluminum foil. Graphene paste, Example 4, was deposited on aluminum foil using the semi-automatic film coater and dried in a hot-air oven at 70-250° C. under ambient conditions for 1-4 hours. Free-standing graphene foils were obtained by gently immersing the dried graphene paste printed aluminum foils in warm water (40-80° C.) and subsequently air dried. The prepared graphene foils were then mechanically compacted by placing them in between a pair of ultra-smooth aluminum foils and passing them through a rotating roll-press (MTI) with a minimum gap setting. This process was repeated three times. These foils were further heat treated at 1900° C. for 2-12 hours under argon atmosphere in a high-temperature furnace. Further, these heat-treated foils were again mechanically compacted by placing them in between a pair of ultra smooth aluminum foils and passing them through a rotating roll-press (MTI) with a minimum gap setting. This process was repeated three times.

Graphene Foil F36:

Different dimensions of graphene foils were prepared using semi-automatic film coater from MTI Corporation (Doctor blade coater). The graphene film thicknesses were controlled by adjusting the gap setting of the doctor blade between 150 and 1200 μm, while depositing wet graphene paste on an aluminum foil. Graphene paste, Example 4, was deposited on aluminum foils using the semi-automatic film coater and dried in a hot-air oven at 70-250° C. under ambient conditions for 1-4 hours. Free-standing graphene foils were obtained by gently immersing the dried graphene paste printed aluminum foils in warm water (40-80° C.) and subsequently air dried. These foils were further heat treated at 2750° C. for 2-72 hours under argon atmosphere in a graphite induction furnace.

Graphene Foil F37:

Graphene paste (Example 17) was stencil printed on an aluminum foil using a manual stencil printer with an 8 mil stencil (rectangular aperture of 1"×2.6") and dried in a hot-air oven at 70-250° C. under ambient conditions for 1-4 hours. Free-standing graphene foils were obtained by gently immersing the graphene printed substrate in warm water (40-80° C.) and subsequently air dried.

Graphene Foil F38:

Graphene paste (Example 17) was stencil printed on an aluminum foil using a manual stencil printer with an 8 mil stencil (rectangular aperture of 1"×2.6") and dried in a hot-air oven at 70-250° C. under ambient conditions for 1-4 hours. Free-standing graphene foils were obtained by gently immersing the graphene printed substrate in warm water (40-80° C.) and subsequently air dried. These foils were further heat treated at 1500° C. for 2-12 hours under nitrogen atmosphere in a high-temperature furnace.

Graphene Foil F39:

Graphene paste (Example 18) was stencil printed on an aluminum foil using a manual stencil printer with an 8 mil stencil (rectangular aperture of 1"×2.6") and dried in a hot-air oven at 70-250° C. under ambient conditions for 1-4 hours. Free-standing graphene foils were obtained by gently immersing the graphene printed substrate in warm water (40-80° C.) and subsequently air dried.

Graphene Foil F40:

Graphene paste (Example 19) was stencil printed on an aluminum foil using a manual stencil printer with 8 mil stencil (rectangular aperture of 1"×2.6") and dried in a hot-air oven at 70-250° C. under ambient conditions for 1-4 hours. Free-standing graphene foils were obtained by gently immersing the graphene printed substrate in warm water (40-80° C.) and subsequently air dried.

Graphene Foil F41:

Graphene paste (Example 20) was stencil printed on an aluminum foil using a manual stencil printer with an 8 mil stencil (rectangular aperture of 1"×2.6") and dried in a hot-air oven at 70-250° C. under ambient conditions for 1-4 hours. Free-standing graphene foils were obtained by gently immersing the graphene printed substrate in warm water (40-80° C.) and subsequently air dried.

Graphene Foil F42:

Graphene paste (Example 21) was stencil printed on an aluminum foil using a manual stencil printer with an 8 mil stencil (rectangular aperture of 1"×2.6") and dried in a hot-air oven at 70-250° C. under ambient conditions for 1-4 hours. Free-standing graphene foils were obtained by gently immersing the graphene printed substrate in warm water (40-80° C.) and subsequently air dried.

Properties of free-standing graphene foils F1-F42 are provided below in Table 2.

TABLE 2

Properties of Free-Standing Foils

| Graphene Foil Name | Thickness (μm) | Density (g/cc) | Electrical Conductivity (S/m) | Thermal Diffusivity (mm$^2$/sec) | Thermal Conductivity (W/m/K) |
|---|---|---|---|---|---|
| F1  | 20 | 0.87  | 2.50E+04 | 44.8  | 27.4 |
| F2  | 22 | 0.75  | 6.10E+04 | 76.3  | 39.9 |
| F6  | 14 | 0.89  | 7.14E+03 | 42.5  | 15.1 |
| F7  | 12 | 1.18  | 2.00E+04 | 42.3  | 19.9 |
| F8  | 10 | 1.39  | 6.25E+04 | 59.0  | 31.7 |
| F9  | 15 | 1.00  | 1.41E+05 | 65.5  | 45.8 |
| F10 | 14 | 0.51  | 5.83E+04 | 60.0  | 12.2 |
| F11 | 17 | 0.73  | 7.50E+04 | 65.5  | 33.5 |
| F12 | 14 | 0.73  | 4.58E+04 | 60.7  | 22.1 |
| F13 | 20 | 1.05  | 8.06E+04 | 63.9  | 46.9 |
| F15 | 7  | 1.60  | 2.00E+04 | 74.6  | 83.6 |
| F16 | 30 | 0.81  | 1.17E+04 | 62.1  | 35.2 |
| F17 | 19 | 0.78  | 1.50E+04 | 40.8  | 22.3 |
| F18 | 22 | 0.77  | 6.68E+04 | 78.0  | 41.8 |
| F19 | 23 | 0.71  | 1.55E+04 | 34.9  | 17.3 |
| F20 | 18 | 0.82  | 6.30E+04 | 81.8  | 46.7 |
| F21 | 24 | 0.67  | 4.20E+03 | 22.3  | 10.5 |
| F22 | 17 | 0.62  | 5.88E+04 | 92.4  | 39.9 |
| F23 | 29 | 0.83  | 3.54E+03 | 18.4  | 10.6 |
| F24 | 22 | 0.68  | 6.42E+04 | 80.6  | 38.3 |
| F25 | 78 | 0.38  | 2.60E+04 | 30.5  | 8.1 |
| F26 | 22 | 0.68  | 6.42E+04 | 80.6  | 38.4 |
| F27 | 19 | 0.67  | 5.90E+04 | 121.9 | 57.2 |
| F28 | 39 | 0.60  | 5.09E+04 | 189.5 | 79.9 |
| F29 | 21 | 1.17  | 9.45E+04 | 187.2 | 153.3 |
| F32 | 42 | 0.42  | 6.18E+03 | 21.7  | 6.4 |
| F34 | 17 | 0.835 | 7.30E+04 | 134.1 | 78.4 |
| F35 | 8  | 1.38  | 8.30E+04 | 136.4 | 131.8 |
| F36 | 45 | 0.86  | 7.05E+04 | 177.9 | 107.6 |
| F37 | 16 | 1.1   | 5.63E+02 | No Signal | No Signal |
| F38 | 32 | 0.25  | 2.23E+04 | 69.3  | 11.9 |

The tensile strength and Young's Modulus for select foils are shown below in Table 3.

TABLE 3

Tensile Strength and Young's Modulus for Select Foils

| Graphene Foil Name | Thickness (μm) | Tensile Strength (MPa) | Young's Modulus (GPa) |
|---|---|---|---|
| F6  | 24   | 34    | 13.9 |
| F7  | 15   | 50.9  | 21.4 |
| F8  | 9.5  | 62.2  | 32.4 |
| F10 | 9.5  | 48.10 | 21 |
| F26 | 10.6 | 47.9  | 20.7 |

IV. Key Applications Include a) EMI Applications: Graphene foils and polymer supported graphene films and formed or fabricated structures, possess excellent EMI shielding properties (>20 dB), which are relevant for several applications.

b) Thermoformed Structures: Thermoformed polymer supported graphene films and printed designs possess excellent adhesion and high electrical conductivities after thermoforming, which are relevant for several practical applications.

Thermoforming is a process in which a flat thermoplastic sheet is heated and deformed into the desired shape. Heating is usually accomplished by radiant electric heaters, located on one or both sides of the starting plastic sheet at a distance of roughly 125 mm (5 in.). The duration of the heating cycle needed to sufficiently soften the sheet depends on the polymer, its thickness and color. The methods by which the forming step is accomplished can be classified into three basic categories: (1) vacuum thermoforming, (2) pressure thermoforming, and (3) mechanical thermoforming. In this investigation, vacuum thermoforming was used. Printed films were thermoformed using specific mold designs. Film continuity, thermoformed object and overall performance of the paste was investigated.

Once printed, the substrate may undergo 3D deformation and the paste should be able to retain its conductivity and other physical properties without getting delaminated. The printed substrate may undergo cold drawing, thermoforming and similar 3D deformation activity in order to produce e.g. 3D components for stretchable electronic surfaces. The important objective of this work was to form a paste which can withstand such operations without losing physical properties such as conductivity or adhesion or getting lines cracked.

c) Barriers: Functional coatings and films prepared using graphene pastes or inks on metal or plastic substrates, structures, parts and components, have barrier properties for gas and moisture and are resistant towards corrosion of underlying metallic layers. These graphene pastes, inks and coatings can be used for providing protective functional coatings on parts, components and structures (metal, plastics, ceramics, etc.) and flexible (polymer, paper, metal foils) surfaces for barrier (gas and moisture) and corrosion protection of underlying metals, electrical circuits or other part of the component or structure.

d) Others: Graphene foils and films are useful for EMI shielding, high-energy beam stripper foils, as thermal heat spreaders, materials for electrodes or other structures for battery and supercapacitors, as gas and moisture barrier layers, for corrosion protection, for protective coatings for metal to inhibit corrosion and for high thermal conducting substrates for electronics or sensors assembly.

The phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items.

As used herein, the term "about" refers to a measurable value such as a parameter, an amount, a temporal duration, and the like and is meant to include variations of +/−15% or less, preferably variations of +/−10% or less, more preferably variations of +/−5% or less, even more preferably variations of +/−1% or less, and still more preferably variations of +/−0.1% or less of and from the particularly recited value, in so far as such variations are appropriate to perform in the invention described herein. Furthermore, it is also to be understood that the value to which the modifier "about" refers is itself specifically disclosed herein.

When introducing elements of the present invention or the preferred embodiments(s) thereof, the articles "a", "an", "the" and "said" are intended to mean that there are one or more of the elements. The terms "comprising," "including," and "having" are intended to be inclusive and mean that there may be additional elements other than the listed elements.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only.

What is claimed is:

1. A method of making graphene foil, the method comprising the steps of:
    a) providing a graphene paste composition comprising:
        i. graphene flakes, wherein the graphene flakes comprise engineered graphene;
        ii. one or more solvents;
        iii. one or more functional additives; and
        iv. one or more binders;
    b) applying the graphene paste to a substrate to form a graphene foil on the substrate;
    c) curing the applied paste by drying the applied paste at a temperature between 150 and 250° C.;
    d) releasing the graphene foil from the substrate to obtain a free-standing foil; and
    e) thermally annealing the free-standing foil at a temperature of 500 to 3000° C.

2. The method according to claim 1 wherein the graphene foil has a thickness between about 0.1 and about 500 µm.

3. The method according to claim 2, wherein the graphene foil has a thickness between about 1 and about 100 µm.

4. The method according to claim 1, wherein the graphene foil has a density between about 0.3 and about 2.0 g/cm$^3$.

5. The method according to claim 4, wherein the graphene foil has a density between about 0.4 and about 2.0 g/cm$^3$.

6. The method according to claim 1, wherein the graphene foil has electrical conductivity between about $1\times10^2$ S/m and about $3\times10^5$ S/m.

7. The method according to claim 6, wherein the graphene foil has electrical conductivity between about $2\times10^2$ S/m and about $2\times10^5$ S/m.

8. The method according to claim 1, wherein the graphene foil has thermal conductivity between about 1 and about 400 W/m·K.

9. The method according to claim 8, wherein the graphene foil has thermal conductivity between 10 and 200 W/m·K.

10. The method according to claim 1, wherein the graphene foil has a tensile strength of at least 20 MPa and Young's Modulus of at least 5 GPa.

11. The method according to claim 10, wherein the graphene foil has a tensile strength of at least 30 MPa and Young's Modulus of at least 10 GPa.

12. The method according to claim 1, wherein the graphene foil is applied to the substrate using a method selected from a stencil, a doctor blade, dye coating, screen printing, jetting, spraying and combinations thereof; and/or
    wherein the substrate comprises glass, aluminum foil, and combinations thereof; and/or
    wherein the foil has EMI shielding effectiveness greater than 20 dB.

13. The method of claim 1 further comprising mechanically compacting the free-standing foil before thermal annealing the foil.

* * * * *